United States Patent
Owen et al.

(10) Patent No.: US 6,721,813 B2
(45) Date of Patent: Apr. 13, 2004

(54) COMPUTER SYSTEM IMPLEMENTING A SYSTEM AND METHOD FOR TRACKING THE PROGRESS OF POSTED WRITE TRANSACTIONS

(75) Inventors: Jonathan M. Owen, Northboro, MA (US); Mark D. Hummel, Franklin, MA (US); James B. Keller, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 457 days.

(21) Appl. No.: 09/774,148

(22) Filed: Jan. 30, 2001

(65) Prior Publication Data

US 2002/0103948 A1 Aug. 1, 2002

(51) Int. Cl.⁷ .................. G06F 13/00; G06F 13/42; G06F 13/14
(52) U.S. Cl. ............ 710/6; 710/5; 710/7; 710/20; 710/21; 710/40; 710/41; 710/45; 710/58; 710/61; 710/107; 710/129; 711/141; 711/151; 712/8; 712/30
(58) Field of Search .................. 710/5, 6, 7, 20, 710/21, 40, 45, 41, 58, 61, 107, 129; 711/141, 151, 203; 712/8, 30

(56) References Cited

U.S. PATENT DOCUMENTS

| | | | | |
|---|---|---|---|---|
| 5,568,620 A | * | 10/1996 | Sarangdhar et al. | 710/105 |
| 5,623,628 A | * | 4/1997 | Brayton et al. | 711/141 |
| 5,644,753 A | * | 7/1997 | Ebrahim et al. | 711/131 |
| 5,682,516 A | * | 10/1997 | Sarangdhar et al. | 711/141 |
| 5,734,922 A | * | 3/1998 | Hagersten et al. | 712/37 |
| 5,749,095 A | * | 5/1998 | Hagersten | 711/141 |
| 5,778,438 A | * | 7/1998 | Merchant | 711/146 |
| 5,881,303 A | * | 3/1999 | Hagersten et al. | 712/30 |
| 5,893,165 A | * | 4/1999 | Ebrahim | 711/158 |
| 5,905,998 A | * | 5/1999 | Ebrahim et al. | 711/144 |
| 5,961,621 A | * | 10/1999 | Wu et al. | 710/107 |
| 5,961,623 A | * | 10/1999 | James et al. | 710/113 |
| 6,070,209 A | * | 5/2000 | Hausauer | 710/104 |
| 6,101,420 A | * | 8/2000 | VanDoren et al. | 700/5 |
| 6,108,752 A | * | 8/2000 | VanDoren et al. | 711/117 |
| 6,167,492 A | * | 12/2000 | Keller et al. | 711/154 |
| 6,209,065 B1 | * | 3/2001 | Van Doren et al. | 711/150 |
| 6,249,846 B1 | * | 6/2001 | Van Doren et al. | 711/144 |
| 6,275,905 B1 | * | 8/2001 | Keller et al. | 711/141 |
| 6,385,705 B1 | * | 5/2002 | Keller et al. | 711/154 |
| 6,389,526 B1 | * | 5/2002 | Keller et al. | 712/30 |
| 6,418,494 B1 | * | 7/2002 | Shatas et al. | 710/305 |
| 6,557,048 B1 | * | 4/2003 | Keller et al. | 710/6 |

* cited by examiner

*Primary Examiner*—Jeffrey Gaffin
*Assistant Examiner*—Tammara Peyton
(74) *Attorney, Agent, or Firm*—Meyertons Hood Kivlin Kowert & Goetzel, P.C.; B. Noël Kivlin

(57) ABSTRACT

A computer system is presented which implements a system and method for tracking the progress of posted write transactions. In one embodiment, the computer system includes a processing subsystem and an input/output (I/O) subsystem. The processing subsystem includes multiple processing nodes interconnected via coherent communication links. Each processing node may include a processor preferably executing software instructions. The I/O subsystem includes one or more I/O nodes. Each I/O node may embody one or more I/O functions (e.g., modem, sound card, etc.). The multiple processing nodes may include a first processing node and a second processing node, wherein the first processing node includes a host bridge, and wherein a memory is coupled to the second processing node. An I/O node may generate a non-coherent write transaction to store data within the second processing node's memory, wherein the non-coherent write transaction is a posted write transaction. The I/O node may dispatch the non-coherent write transaction directed to the host bridge. The host bridge may respond to the non-coherent write transaction by translating the non-coherent write transaction to a coherent write transaction, and dispatching the coherent write transaction to the second processing node. The second processing node may respond to the coherent write transaction by dispatching a target done response directed to the host bridge.

30 Claims, 14 Drawing Sheets

| Bit Time | 7 | 6 | 5 | 4 | 3 | 2 | 1 | 0 |
|---|---|---|---|---|---|---|---|---|
| 0 | | | CMD[5:0] | | | | | |
| 1 | | | | | | | | |
| 2 | | | | | | | | |
| 3 | | | | | | | | |

| Bit Time | 7 | 6 | 5 | 4 | 3 | 2 | 1 | 0 |
|---|---|---|---|---|---|---|---|---|
| 0 | SrcUnit[1:0] | | CMD[5:0] | | | | | |
| 1 | DestNode[2:0] | | | Dest Unit[1:0] | | SrcNode[2:0] | | |
| 2 | | | | SrcTag[4:0] | | | | |
| 3 | | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | SrcUnit[1:0] | | CMD[5:0] | | | | | |
| 1 | DestNode[2:0] | | | Dest Unit [1:0] | | SrcNode[2:0] | | |
| 2 | | | | SrcTag[4:0] | | | | |
| 3 | Sh | | | | | | | |

| Bit Time | 7 | 6 | 5 | 4 | 3 | 2 | 1 | 0 |
|---|---|---|---|---|---|---|---|---|
| 0 | Data[7:0] | | | | | | | |
| 1 | Data[15:8] | | | | | | | |
| 2 | Data[23:16] | | | | | | | |
| 3 | Data[31:24] | | | | | | | |
| 4 | Data[39:32] | | | | | | | |
| 5 | Data[47:40] | | | | | | | |
| 6 | Data[55:48] | | | | | | | |
| 7 | Data[63:56] | | | | | | | |

| CMD Code | VChan | Command | Packet Type |
|---|---|---|---|
| 000000 | - | Nop | Info |
| 000001 | NPC | VicBlk | Request / Address / Data |
| 000010 | - | Reserved | - |
| 000011 | NPC | ValidateBlk | Request / Address |
| 000100 | NPC | RdBlk | Request / Address |
| 000101 | NPC | RdBlkS | Request / Address |
| 000110 | NPC | RdBlkMod | Request / Address |
| 000111 | NPC | ChangeToDirty | Request / Address |
| x01xxx | NPC or PC | Wr(Sized) | Request / Address / Data |
| 01xxxx | NPC | Read(Sized) | Request / Address |
| 100xxx | - | Reserved | - |
| 110000 | R | RdResponse | Response / Data |
| 110001 | R | ProbeResp | Response |
| 110010 | R | TgtStart | Response |
| 110011 | R | TgtDone | Response |
| 110100 | R | SrcDone | Response |
| 110101 | R | MemCancel | Response |
| 11011x | - | Reserved | - |
| 11100x | P | Probe | Request / Address |
| 11101x | P | Broadcast | Request / Address |
| 11110x | - | Reserved | - |
| 111110 | - | Reserved | - |
| 111111 | - | Sync | Info |

| Bit Time | 7 | 6 | 5 | 4 | 3 | 2 | 1 | 0 |
|---|---|---|---|---|---|---|---|---|
| 0 | SeqID[3:2] | | CMD[5:0] | | | | | |
| 1 | Pass PW | SeqID[1:0] | | UnitID[4:0] | | | | |
| 2 | | | | SrcTag[4:0] | | | | |
| 3 | | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | | | CMD[5:0] | | | | | |
| 1 | Pass PW | | | UnitID[4:0] | | | | |
| 2 | | | | SrcTag[4:0] | | | | |
| 3 | | | | | | | | |

| CMD Code | VChan | Command | Packet Type |
|---|---|---|---|
| 000000 | - | Nop | Info |
| 000001 | - | Reserved | - |
| 000010 | NPC | Flush | Request |
| 000011 | - | Reserved | - |
| 0001xx | - | Reserved | - |
| x01xxx | NPC or PC | Wr(Sized) | Request / Address / Data |
| 01xxxx | NPC | Read(Sized) | Request / Address |
| 100xxx | - | Reserved | - |
| 110000 | R | RdResponse | Response / Data |
| 110001 | - | Reserved | - |
| 110010 | - | Reserved | - |
| 110011 | R | TgtDone | Response |
| 11010x | - | Reserved | - |
| 11011x | - | Reserved | - |
| 11100x | - | Reserved | - |
| 11101x | PC or NPC | Broadcast | Request / Address |
| 111100 | PC | Fence | Request |
| 111101 | - | Reserved | - |
| 111110 | - | Reserved | - |
| 111111 | - | Sync | Info |

| Row Pass Column? | Posted Request | Non-Posted Request | Response |
|---|---|---|---|
| Posted Request | PassPW: X<br>!PassPW: No | Yes | Yes |
| Non-Posted Request | PassPW: X<br>!PassPW: No | X | X |
| Response | PassPW: X<br>!PassPW: No | Yes | X |

| Request$_1$ Type | Request$_2$ Type | Wait Requirements |
|---|---|---|
| Memory Write | Memory Write | 1. Req$_2$ must wait for TgtStart$_1$.<br>2. SrcDone$_2$ must wait for TgtDone$_1$.<br>3. TgtDone$_2$ on the non Non-coherent Link(if required) must wait for TgtDone$_1$. |
| Memory Write | Memory Read | 1. Req$_2$ must wait for TgtStart$_1$.<br>2. TgtDone$_2$ on the non Non-coherent Link must wait for TgtDone$_1$. |
| Memory Read | Memory Request | Req$_2$ must wait for TgtStart$_1$. |
| Memory Write | I/O Request or Interrupt | Req$_2$ must wait for TgtStart$_1$. |
| Memory Read | I/O Request | Req$_2$ must wait for TgtStart$_1$. |
| Memory Write | Flush | TgtDone$_2$ on the non-coherent Link must wait for TgtDone$_1$. (Flush does not cause any requests to be issued to the coherent Fabric.) |
| Memory Read | Flush or Interrupt | No wait requirements |
| Memory Write | Response | Response$_2$ must wait for TgtDone$_1$. |
| Memory Read | Response | Response$_2$ must wait fir TgtStart$_1$. |
| I/O Request | Memory Request | Req$_2$ must wait fir TgtStart$_1$. |
| I/O Request | I/O Request or Interrupt | Req$_2$ must wait fir TgtStart$_1$. |
| I/O Request | Flush | TgtDone$_2$ on the non-coherent link must wait for TgtStart$_1$. (Flush does not cause any requests to be issued to the coherent fabric.) |
| I/O Request | Response | Response$_2$ must wait for TgtStart$_1$. |
| Flush | Anything | No wait requirements |
| Response | Anything | No wait requirements |
| Fixed / Non Vectored Interrupt | Response | Response$_2$ must wait for all broadcast message responses to be received. |
| Fixed / Non Vectored Interrupt | Anything but Response | No wait requirements |
| LPA Interrupt | Anything | No wait requirements |
| SysMgt | Anything | No wait requirements |
| Fence | Posted Request | Req$_2$ must wait for fence to be retired. |
| Fence | Anything Nonposted | No wait requirements |
| Posted Memory Write | Fence | Req$_2$ may be retired when TgtDone$_1$. |
| Posted I/O Write | Fence | Req$_2$ may be retired when TgtStart$_1$. |
| Anything Nonposted | Fence | No wait requirements |

| Bit Time | 7 | 6 | 5 | 4 | 3 | 2 | 1 | 0 |
|---|---|---|---|---|---|---|---|---|
| 0 | SeqId[3:2] | | Cmd[5:0] | | | | | |
| 1 | Pass PW | SeqId[1:0] | | UnitID[4:0] | | | | |
| 2 | Mask/Count[1:0] | | Compat | SrcTag[4:0]/Rsv | | | | |
| 3 | Addr[7:2] | | | | | | Mask/Count[3:2] | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

FIG. 14

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | MaskCount[1:0] | | Compat | SrcTag[4:0] | | | | |
| 3 | Addr[7:2] | | | | | | Mask/Count[3:2] | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

FIG. 15

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | TgtNode[2:0] | | | TgtUnit[1:0] | | SrcNode[2:0] | | |
| 2 | MD | Rsv | | SrcTag[4:0] | | | | |
| 3 | Addr[7:3] | | | | | NextState[1:0] | | RD |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

FIG. 17

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | Rsv | | Error | SrcTag[4:0] | | | | |
| 3 | Shared | Rsv | | | | | | |

FIG. 18

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | Rsv | | Error | SrcTag[4:0] | | | | |
| 3 | Rsv | | | | | Rsv | | |

*FIG. 19*

| Bit Time | 7 | 6 | 5 | 4 | 3 | 2 | 1 | 0 |
|---|---|---|---|---|---|---|---|---|
| 0 | Rsv | | Cmd[5:0] | | | | | |
| 1 | Pass-PW | Bridge | Rsv | UnitID[4:0] | | | | |
| 2 | Rsv | | Error | SrcTag[4:0] | | | | |
| 3 | Rsv | | NXA | Rsv | | | | |

*FIG. 20*

| Bit Time | 7 | 6 | 5 | 4 | 3 | 2 | 1 | 0 |
|---|---|---|---|---|---|---|---|---|
| 0 | SrcUnit[1:0] | | Cmd[5:0] | | | | | |
| 1 | DestNode[2:0] | | | DestUnit[1:0] | | SrcNode[2:0] | | |
| 2 | Rsv | | Error | SrcTag[4:0] | | | | |
| 3 | Rsv | | | | | Cancel | Rsv | |

*FIG. 21*

| Bit Time | 7 | 6 | 5 | 4 | 3 | 2 | 1 | 0 |
|---|---|---|---|---|---|---|---|---|
| 0 | Seqld[3:2] | | Cmd[5:0] | | | | | |
| 1 | Pass PW | Seqld[1:0] | | UnitID[4:0] | | | | |
| 2 | Rsv | | | SrcTag[4:0] | | | | |
| 3 | Rsv | | | | | | | |

COMPUTER SYSTEM IMPLEMENTING A SYSTEM AND METHOD FOR TRACKING THE PROGRESS OF POSTED WRITE TRANSACTIONS

FIELD OF THE INVENTION

This invention is related to the field of computer systems and, more particularly, to computer systems in which certain write transactions may be considered completed by a source upon transmission (i.e., posted write transactions).

BACKGROUND OF THE INVENTION

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced.

On the other hand, distributed memory systems lack many of the above disadvantages. A computer system with a distributed memory system includes multiple nodes, two or more of which are coupled to different memories. The nodes are coupled to one another using any suitable interconnect. For example, each node may be coupled to each other node using dedicated lines. Alternatively, each node may connect to a fixed number of other nodes, and transactions may be routed from a first node to a second node to which the first node is not directly connected via one or more intermediate nodes. A memory address space of the computer system is assigned across the memories in each node.

In general, a "node" is a device which is capable of participating in transactions upon the interconnect. For example, the interconnect may be packet based, and the node may be configured to receive and transmit packets as part of a transaction. Generally speaking, a transaction is a series of packets. A "requester" or "source" node initiates a transaction directed to a "target" node by issuing a request packet. Each packet which is part of the transaction is communicated between two nodes, with the receiving node being designated as the "destination" of the individual packet. When a packet ultimately reaches the target node, the target node accepts the information conveyed by the packet and processes the information internally. Alternatively, a node located on a communication path between the requester and target nodes may relay the packet from the requester node to the target node.

In addition to the original request packet, the transaction may result in the issuance of other types of packets, such as responses, probes, and broadcasts, each of which is directed to a particular destination. For example, upon receipt of the original request packet, the target node may issue broadcast or probe packets to other nodes in the processing system. These nodes, in turn, may generate responses, which may be directed to either the target node or the requester node. If directed to the target node, the target node may respond by issuing a response back to the requester node.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g., for coherency purposes). On the other hand, in distributed systems, nodes may initiate transactions concurrently and use the interconnect to transmit the transactions to other nodes. These transactions may have logical conflicts between them (e.g. coherency conflicts for transactions involving the same address) and may experience resource conflicts (e.g. buffer space may not be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

For example, certain deadlock conditions may occur in known I/O systems, such as the Peripheral Component Interconnect (PCI) I/O system, unless packets associated with a "posted" write transaction are allowed to pass other traffic not associated with a posted write transaction. Generally speaking, a posted write transaction is considered complete by the requester when the write request and corresponding data are transmitted by the requester (e.g., by a source interface). A posted write transaction is thus effectively completed at the requester. However, because the requester is not directly aware of when the posted write transaction is actually completed by the target, more ordering support for posted transactions may be required in hardware. If sufficient hardware is available to support ordering, the requester may issue additional requests while the packet or packets of the posted write transaction travel to the target, with the assumption that such additional requests will complete after the initial posted transaction completes.

In contrast, a "non-posted" write transaction is not considered complete by the requester until the target (e.g., a target interface) has completed the non-posted write transaction. The target generally transmits an acknowledgement to the requester when the non-posted write transaction is completed. Such acknowledgements, however, consume interconnect bandwidth and must be received and accounted for by the requester. Non-posted write transactions may be issued, for example, when the requester needs to know that previous transactions have been completed before issuing subsequent transactions.

In a computer system having a distributed memory system, memory requests (e.g., read and write transactions)

originating from I/O nodes may need to be properly ordered with respect to other pending memory operations to preserve memory coherency within the computer system and to satisfy ordering requirements expected by the I/O nodes. For example, memory operations may need to be completed in the order in which they were generated to preserve memory coherency within the computer system and to satisfy I/O ordering requirements. It would thus be desirable to have a computer system implementing a system and method for tracking the progress of posted write transactions. Such a system and method would facilitate proper ordering of I/O memory operations.

SUMMARY OF THE INVENTION

A computer system is presented which implements a system and method for tracking the progress of posted write transactions. In one embodiment, the computer system includes a processing subsystem and an input/output (I/O) subsystem. The processing subsystem includes multiple processing nodes interconnected via coherent communication links. Each processing node may include a processor preferably executing software instructions (e.g., a processor core configured to execute instructions of a predefined instruction set). The I/O subsystem includes at least one I/O node, and may include multiple I/O nodes coupled via non-coherent communication links one after another in series or daisy chain fashion. Each I/O node may embody one or more I/O functions (e.g., modem, sound card, etc.).

The multiple processing nodes may include a first processing node and a second processing node, wherein the first processing node includes a host bridge, and wherein a memory is coupled to the second processing node. The host bridge translates packets moving between the processing subsystem and the I/O subsystem. One of the I/O nodes is coupled to the first processing node via a non-coherent communication link. The I/O node coupled to the first processing node may generate a non-coherent write transaction to store data within the memory, wherein the non-coherent write transaction is a posted write transaction. The I/O node may dispatch the non-coherent write transaction directed to the host bridge.

As a posted write transaction, the non-coherent write transaction may be completed by the I/O node when the non-coherent write transaction is dispatched by the I/O node. I/O transaction packets may travel in one of multiple separate virtual channels within the I/O subsystem. For example, the non-coherent write transaction may travel within a posted command virtual channel of the I/O subsystem, wherein the posted command virtual channel is separate from a non-posted command virtual channel of the I/O subsystem.

The host bridge may respond to the non-coherent write transaction by translating the non-coherent write transaction to a coherent write transaction, and dispatching the coherent write transaction within the processing subsystem. The coherent write transaction is directed to the second processing node. The second processing node may respond to the coherent write transaction by dispatching a target done response directed to the host bridge.

The second processing node may issue the target done response when the coherent write transaction has at least reached a "point of coherency" within the processing subsystem. The coherent write transaction may reach the point of coherency when the coherent write transaction is: (i) ordered within the second processing node with respect to other requests pending within the second processing node, and (ii) a coherency state with respect to the coherent write transaction has been established in the other processing nodes.

The host bridge may include translation logic for translating the non-coherent write transaction to the coherent write transaction. The host bridge may also include a data buffer for storing transaction data associated with the non-coherent write transaction and the corresponding coherent write transaction. The transaction data may include data identifying the non-coherent write transaction as a posted write transaction, and data identifying the I/O node coupled to the first processing node as the source of the non-coherent write transaction. The data identifying the I/O node coupled to the first processing node as the source of the non-coherent write transaction may include a unit ID value extracted from the non-coherent write transaction by the host bridge. The unit ID value may be one of several unit IDs assigned to the I/O node coupled to the first processing node.

In one embodiment of a method for use in the computer system described above, the I/O subsystem dispatches the non-coherent write transaction to the host bridge. The non-coherent posted write is considered complete by the I/O subsystem as soon as the non-coherent posted write is dispatched to the host bridge. The host bridge translates the non-coherent write transaction to a coherent write transaction, and dispatches the coherent write transaction to a target within the processing subsystem. The target may be, for example, a memory controller within the second processing node and coupled to the memory. The target dispatches a target done response directed to the host bridge in response to the coherent write transaction. The target may dispatch the target done response in response to the coherent write transaction at least reaching a point of coherency within the computer system as described above. The target done response may thus signify that the coherent write transaction has at least reached the point of coherency within the processing subsystem, allowing subsequent order-dependent coherent transactions to be issued by the host bridge. The I/O node coupled to the second processing node may be a source of the non-coherent write transaction. The non-coherent and coherent write transactions and the target done response may be dispatched as one or more packets.

The above described system and method for tracking the progress of posted write transactions allows an I/O node within the I/O subsystem to garner the performance advantages offered by posted write transactions, while at the same time facilitating proper ordering of the posted write transactions.

BRIEF DESCRIPTION OF THE DRAWINGS

Other objects and advantages of the invention will become apparent upon reading the following detailed description and upon reference to the accompanying drawings in which:

FIG. 3 is a diagram of an exemplary coherent information packet which may be employed within the processing subsystem;

FIG. 4 is a diagram of an exemplary coherent request packet which may be employed within the processing subsystem;

FIG. 5 is a diagram of an exemplary coherent response packet which may be employed within the processing subsystem;

FIG. 6 is a diagram of an exemplary coherent data packet which may be employed within the processing subsystem;

FIG. 7 is a table listing different types of coherent packets which may be employed within the processing subsystem;

FIG. 8 is a diagram of an exemplary non-coherent request packet which may be employed within the I/O subsystem;

FIG. 9 is a diagram of an exemplary non-coherent response packet which may be employed within the I/O subsystem;

FIG. 10 is a table listing different types of non-coherent packets which may be employed within the I/O subsystem;

FIG. 11 is a table listing ordering rules which may be implemented regarding packets traveling in different virtual channels of the I/O subsystem;

FIG. 12 is a table listing ordering rules which may be implemented by the host bridge regarding transactions originating within the I/O subsystem and entering the processing subsystem;

FIG. 14 is a diagram of an exemplary non-coherent sized write request packet format;

FIG. 15 is a diagram of an exemplary coherent sized write request packet format;

FIG. 17 is a diagram of one embodiment of a probe request packet;

FIG. 18 is a diagram of one embodiment of a probe response packet;

FIG. 19 is a diagram of one embodiment of a coherent target done response packet;

FIG. 20 is a diagram of one embodiment of a non-coherent target done response packet;

FIG. 21 is a diagram of one embodiment of a coherent source done response packet;

Figure 1:
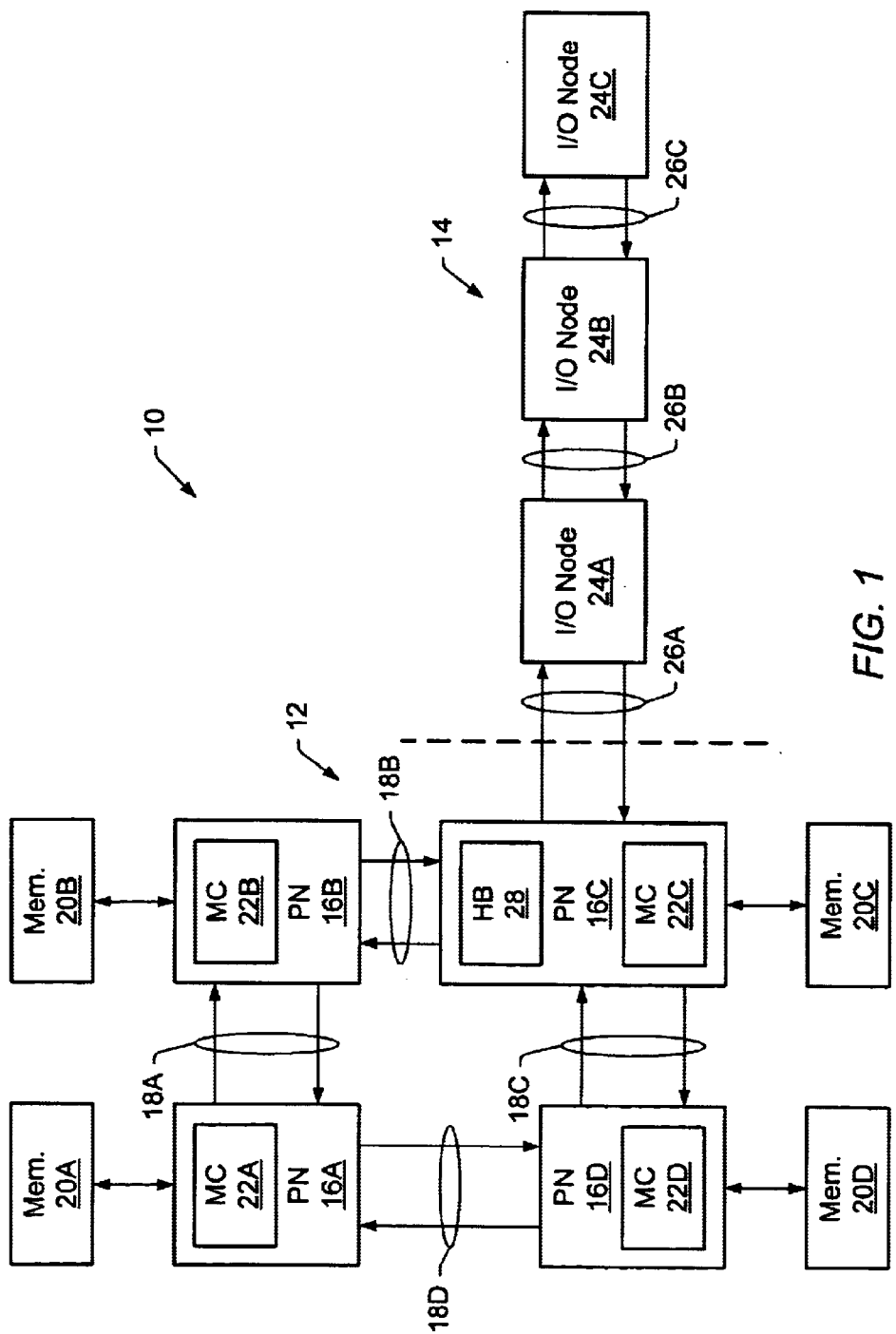
FIG. 1 is a block diagram of one embodiment of a computer system including a processing subsystem and an input/output (I/O) subsystem, wherein the processing subsystem includes several processing nodes, and wherein one of the processing nodes includes a host bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a block diagram of one embodiment of a computer system 10 including a processing subsystem 12 and an input/output (I/O) subsystem 14. Other embodiments of computer system 10 are possible and contemplated. Processing subsystem 12 includes several processing nodes (PN) 16A, 16B, 16C, and 16D. Processing node 16A is coupled to processing node 16B via a bidirectional communication link 18A. Similarly, processing node 16B is coupled to processing node 16C by a bidirectional communication link 18B, processing node 16C is coupled to processing node 16D by a bidirectional communication link 18C, and processing node 16D is coupled to processing node 16A by a bidirectional communication link 18D. As indicated in FIG. 1 and described in more detail below, each bidirectional communication link 18 within processing subsystem 12 may include two unidirectional sets of transmission media (e.g., wires).

Each processing node 16A–16D is coupled to a respective memory 20A–20D via a memory controller (MC) 22A–22D included within each respective processing node 16A–16D. As will be described in more detail below, a memory address space of computer system 10 is assigned across memories 20A–20D such that computer system 10 has a distributed memory system.

I/O subsystem 14 includes several I/O nodes 24A, 24B, and 24C. Each I/O node 24 may embody one or more I/O functions (e.g., modem, sound card, etc.). I/O node 24A is coupled to processing node 16C via a bidirectional communication link 26A. Similarly, I/O node 24B is coupled to I/O node 24A via a bidirectional communication link 26B, and I/O node 24C is coupled to I/O node 24B via a bidirectional communication link 26C. I/O nodes 22A–22C are thus coupled one after another in series or daisy chain fashion. As indicated in FIG. 1 and described in more detail below, each bidirectional communication link 26 within I/O subsystem 14 may include two unidirectional sets of transmission media (e.g., wires).

Figure 2:
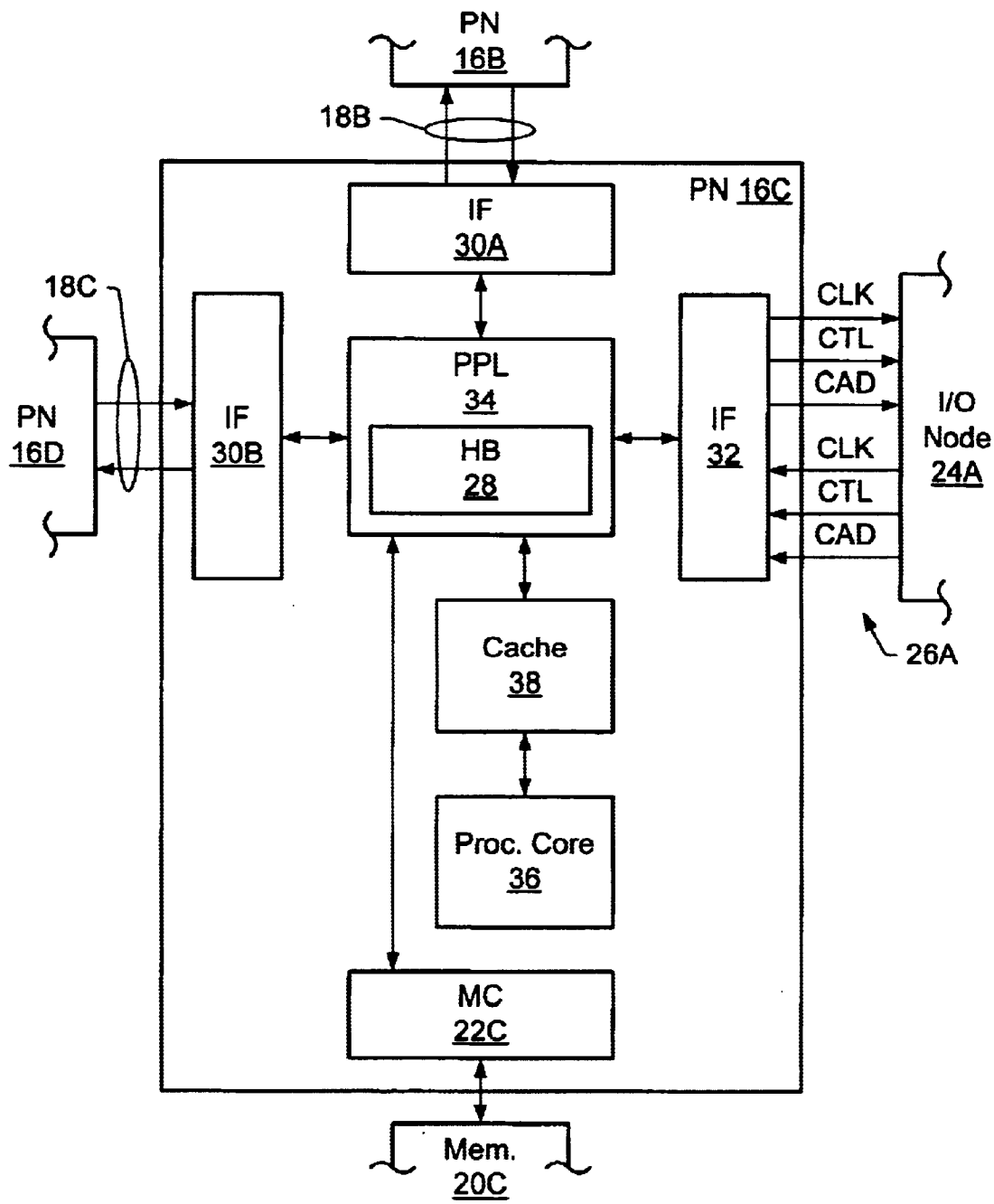
FIG. 2 is a block diagram of one embodiment of the processing node of FIG. 1 including the host bridge.

Processing node 16C includes a host bridge 28 forming an interface between I/O subsystem 14 and processing subsystem 12. FIG. 2 is a block diagram of one embodiment of processing node 16C of FIG. 1. In addition to memory controller 22C, processing node 16C includes a communication interface (IF) 30A coupled to link 18B, a communication interface 30B coupled to link 18C, and a communication interface 32 coupled to link 26A. Processing node 16C communicates with processing nodes 16B and 16D via respective interfaces 30A and 30B, and communicates with I/O node 24A via interface 32. Packet processing logic (PPL) 34 includes host bridge 28, and is coupled to interfaces 30A, 30B, and 32, and to memory controller 22C. Processing node 16C also includes a processor core 36 coupled to a cache memory 38. Cache 38 is coupled to packet processing logic 34.

Processor core 36 preferably includes circuitry for executing instructions according to a predefined instruction set. For example, the x86 instruction set architecture may be selected. Alternatively, the Alpha, PowerPC, or any other instruction set architecture may be selected. Generally, processor core 36 accesses cache 38 for instructions and data. If needed instructions and/or data are not present within cache 38 (i.e., a cache miss is detected), a read request is generated and transmitted to the memory controller within the processing node to which the missing cache block is mapped.

Each processing node 16 in FIG. 1 may include a processor core similar to processor core 36, a cache similar to cache 38, packet processing logic similar to packet processing logic 34 (minus host bridge 28), and interfaces similar to interfaces 30. Alternatively, each processing node 16 may include packet processing logic 34 with host bridge 28, and host bridge 28 in processing nodes 16A, 16B, and 16D may be idle.

Memories 20A–20D in FIG. 1 may include any suitable memory devices. For example, each memory 20 may include one or more RAMBUS DRAMs (RDRAMs), synchronous DRAMs (SDRAMs), static RAM, etc. As described above, the address space of computer system 10 is divided among memories 20A–20D. Each processing node 16A–16D may include a memory map used to determine which addresses are mapped to each of the memories 20A–20D, and hence to which processing node 16A–16D a memory request for a particular address should be routed.

Memory controllers 22A–22D coupled to respective memories 20A–20D include control circuitry for interfacing to memories 20A–20D. Memory controllers 22A–22D may include request queues for queuing memory access requests. Where multiple processing nodes 16 include caches similar to cache 38, memory controllers 22A–22D may be responsible for ensuring that memory accesses to respective memories 20A–20D occur in a cache coherent fashion.

As indicated in FIGS. 1 and 2 and described above, bi-directional communication links 18 and 26 may include two unidirectional sets of transmission media (e.g., wires). In an exemplary embodiment, communication link 26A in FIG. 2 includes a first set of three unidirectional transmission media directed from interface 32 to I/O node 24A, and a second set of three unidirectional transmission media directed from I/O node 24A to interface 32. Both the first and second sets include separate transmission media for a clock (CLK) signal, a control (CTL) signal, and a command/address/data (CAD) signal. In a preferred embodiment, the CLK signals serves as a clock signal for the CTL and CAD signals. A separate CLK signal may be provided for each eight-bit byte of the CAD signal. The CAD signal is used to convey control information and data. Types of control packets include request packets, response packets, and information packets. The CAD signal may be, for example, 8, 16, or 32 bits wide, and may thus include 8, 16, or 32 separate transmission media.

The CTL signal is asserted when the CAD signal conveys a bit time of control information, and is deasserted when the CAD signal conveys a bit time of data. The CTL and CAD signals may transmit different information on the rising and falling edges of the CLK signal. Accordingly, two bit times may be transmitted in each period of the CLK signal. Communication link 26A in FIG. 2 and described above is preferably typical of communication links 18 within processing subsystem 12 and communication links 26 within I/O subsystem 14.

Processing nodes 16A–16D implement a packet-based link for inter-processing node communication. Communication links 18 are used to transmit packets between processing nodes 16 within processing subsystem 12, and are operated in a "coherent" fashion such that processing subsystem 12 preserves the coherency of data stored within memories 20A–20D and the caches of processing nodes 16A–16D.

I/O nodes 24A–24C also implement a packet-based link for inter-I/O node communication. Communication links 26B and 26C are used to transmit packets between I/O nodes 24 within I/O subsystem 14, and communication link 26A is used to transmit packets between I/O node 24A and processing node 16C. Communication links 26A–26C are operated in a "non-coherent" fashion since data stored in I/O subsystem 14 is not cached.

Interface logic used within computer system 10 (e.g., interface logic 30A–30B and 32) may include buffers for receiving packets from a communication link and for buffering packets to be transmitted upon the communication link. Computer system 10 may employ any suitable flow control mechanism for transmitting packets. For example, interface logic within each node may store a count of the number of each type of buffer within interface logic of a receiver node at the other end of a communication link. A sending node may not transmit a packet unless the receiving node has a free buffer of the correct type for storing the packet. As each buffer is freed within the receiving node (e.g., by forwarding a stored packet), the receiving node transmits a message to the sending node indicating that the buffer has been freed. Such a mechanism may be referred to as a "coupon-based" system.

A packet transmitted within computer system 10 may pass through one or more intermediate processing and/or I/O nodes. For example, a packet transmitted by processing node 16A to processing node 16C within processing subsystem 12 may pass through either processing node 16B or processing node 16D. (See FIG. 1.) Any suitable packet routing algorithm may be used within processing subsystem 12. Generally speaking, packets transmitted within I/O subsystem 14 travel in I/O streams, which are groupings of traffic that can be treated independently by the noncoherent fabric. In an exemplary embodiment, direct peer-to-peer communications do not exist within the noncoherent fabric, and all packets travel either to or from the host bridge 28 in processing node 16C. Accordingly, packets in the I/O subsystem are either transmitted in a direction toward processing node 16C (i.e., "upstream") or in a direction away from processing node 16C (i.e., "downstream"), and may pass through one or more intermediate I/O nodes 24. For example, a packet transmitted by I/O node 24C to I/O node 24A passes through I/O node 24B, through I/O node 24A, to host bridge 28, and back to I/O node 24A. Thus, peer-to-peer communication is indirectly supported by having a requester issue a packet to the host bridge 28, and having the host bridge 28 generate a packet back downstream to the target. Other embodiments of computer system 10 may include more or fewer processing nodes 16 and/or I/O nodes 24 than the embodiment of FIG. 1.

The coherent packets used within processing subsystem 12 and the non-coherent packets used in I/O subsystem 14 may have different formats, and may include different data. As will be described in more detail below, host bridge 28 within processing node 16C translates packets moving from one subsystem to the other. For example, a non-coherent packet transmitted by I/O node 24B and having a target within processing node 16A passes through I/O node 24A to processing node 16C. Host bridge 28 within processing node 16C translates the non-coherent packet to a corresponding coherent packet. Processing node 16C may transmit the coherent packet to either processing node 16B or processing node 16D. If processing node 16C transmits the coherent packet to processing node 16B, processing node 16B may receive the packet, then forward the packet to processing node 16A. On the other hand, if processing node 16C transmits the coherent packet to processing node 16D, processing node 16D may receive the packet, then forward the packet to processing node 16A.

Coherent Packets Within Processing Subsystem 12

FIGS. 3–6 illustrate exemplary coherent packet formats which may be employed within processing subsystem 12. FIGS. 3–5 illustrate exemplary coherent information, request, and response packets, respectively, and FIG. 6 illustrates an exemplary coherent data packet. Information (info) packets carry information related to the general operation of the communication link, such as flow control information, error status, etc. Request and response packets carry control information regarding a transaction. Certain request and response packets may specify that a data packet follows. The data packet carries data associated with the transaction and the corresponding request or response packet. Other embodiments may employ different packet formats.

The exemplary packet formats of FIGS. 3–6 show the contents of bits 7-0 of eight-bit bytes transmitted in parallel during consecutive "bit times". The amount of time used to transmit each data unit of a packet (e.g., byte) is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal. Bit times for which no value is provided in the figures may either be reserved for a given packet, or may be used to transmit packet-specific information. Fields indicated by dotted lines indicate optional fields which may not be included in all of the packets of a certain type.

FIG. 3 is a diagram of an exemplary coherent information (info) packet 40 which may be employed within processing subsystem 12. Info packet 40 includes four bit times on an eight-bit coherent communication link. A six-bit command field Cmd[5:0] is transmitted during the first bit time (i.e., bit time 0). The request and response packets of FIGS. 4 and 5 include a similar command encoding in the same bit positions during bit time 0. Info packet 40 may be used to transmit messages between nearest neighbor nodes. Info packets are not routed within the fabric and, hence, may not require any buffering in the receiver nodes. Additionally, info packets may be used to transmit messages indicating the freeing of buffers in the coupon-based flow control scheme described above. Other types of information packets include a system synchronization (Sync) packet and a no-operation (NOP) packet. In one embodiment, the messaging protocol may require that info packets are not flow controlled and should always be accepted at their destination node.

FIG. 4 is a diagram of an exemplary coherent request packet 42, which may be employed within processing subsystem 12. Request packet 42 comprises eight bit times on an eight-bit coherent communication link. Request packet 42 may be used to initiate a transaction (e.g. a read or write transaction), as well as to transmit requests in the process of carrying out the transaction for those requests which carry the address affected by the transaction. Generally, a request packet indicates an operation to be performed by the destination node.

The bits of a command field Cmd[5:0] identifying the type of request are transmitted during bit time 0. Bits of a source unit field SrcUnit[1:0] containing a value identifying a source unit within the source node are also transmitted during bit time 0. Types of units within computer system 10 may include memory controllers, caches, processors, etc. Bits of a source node field SrcNode[2:0] containing a value identifying the source node are transmitted during bit time 1. Bits of a destination node field DestNode[2:0] containing a value which uniquely identifies the destination node may also be transmitted during bit time 1, and may be used to route the packet to the destination node. Bits of a destination unit field DestUnit[1:0] containing a value identifying the destination unit within the destination node which is to receive the packet may also be transmitted during bit time 1.

Many request packets may also include bits of a source tag field SrcTag[4:0] in bit time 2 which, together with the source node field SrcNode[2:0] and the source unit field SrcUnit[1:0], may link the packet to a particular transaction of which it is a part. Bit time 3 may be used in some requests to transmit the least significant bits of the address affected by the transaction. Bit times 4–7 are used to transmit the bits of an address field Addr[39:8] containing the most significant bits of the address affected by the transaction. Some of the undefined fields in packet 42 may be used in various request packets to carry command-specific information.

FIG. 5 is a diagram of an exemplary coherent response packet 44 which may be employed within processing subsystem 12. Response packet 44 includes the command field Cmd[5:0], the destination node field DestNode[2:0], and the destination unit field DestUnit[1:0]. The destination node field DestNode[2:0] identifies the destination node for the response packet (which may, in some cases, be the requester node or target node of the transaction). The destination unit field DestUnit[1:0] identifies the destination unit within the destination node. Various types of response packets may include additional information. For example, a read response packet may indicate the amount of read data provided in a following data packet. Probe responses may indicate whether or not a copy of the requested cache block is being retained by the probed node (using the optional shared bit "Sh" in bit time 3).

Generally, response packet 44 is used for responses during the carrying out of a transaction which do not require transmission of the address affected by the transaction. Furthermore, response packet 44 may be used to transmit positive acknowledgement packets to terminate a transaction. Similar to the request packet 42, response packet 44 may include the source node field SrcNode[2:0], the source unit field SrcUnit[1:0], and the source tag field SrcTag[4:0] for many types of responses (illustrated as optional fields in FIG. 5).

FIG. 6 is a diagram of an exemplary coherent data packet 46 which may be employed within processing subsystem 12. Data packet 46 of FIG. 6 includes eight bit times on an eight-bit coherent communication link. Data packet 46 may comprise different numbers of bit times dependent upon the amount of data being transferred. For example, in one embodiment a cache block comprises 64 bytes and hence 64 bit times on an eight-bit link. Other embodiments may define a cache block to be of a different size, as desired. Additionally, data may be transmitted in less than cache block sizes for non-cacheable reads and writes. Data packets for transmitting data less than cache block size employ fewer bit times. In one embodiment, non-cache block sized data packets may transmit several bit times of mask bits prior to transmitting the data to indicate which data bytes are valid within the data packet. Furthermore, cache block data may be returned as an eight-byte quadword addressed by the least significant bits of the request address first, followed by interleaved return of the remaining quadwords.

FIGS. 3–6 illustrate packets for eight-bit coherent communication links. Packets for 16 and 32 bit links may be formed by concatenating consecutive bit times of FIGS. 3–6. For example, bit time 0 of a packet on a 16-bit link may comprise the information transmitted during bit times 0 and 1 on the eight-bit link. Similarly, bit time 0 of the packet on a 32-bit link may comprise the information transmitted during bit times 0–3 on the eight-bit link.

FIG. 7 is a table 48 listing different types of coherent packets which may be employed within processing subsystem 12. Other embodiments of processing subsystem 12 are possible and contemplated, and may include other suitable sets of packet types and command field encodings. Table 48 includes a command code column including the contents of command field Cmd[5:0] for each coherent command, a command column including a mnemonic representing the command, and a packet type column indicating which of coherent packets 40, 42, and 44 (and data packet 46, where specified) is employed for that command. A brief functional description of some of the commands in table 48 is provided below.

A read transaction may be initiated using a sized read (Read(Sized)) request, a read block (RdBlk) request, a read block shared (RdBlkS) request, or a read block with modify (RdBlkMod) request. The Read(Sized) request is used for non-cacheable reads or reads of data other than a cache block in size. The amount of data to be read is encoded into the Read(Sized) request packet. For reads of a cache block, the RdBlk request may be used unless: (i) a writeable copy of the cache block is desired, in which case the RdBlkMod request may be used; or (ii) a copy of the cache block is desired but no intention to modify the block is known, in which case the RdBlkS request may be used. The RdBlkS request may be used to make certain types of coherency schemes (e.g. directory-based coherency schemes) more efficient.

In general, to initiate the transaction, the appropriate read request is transmitted from the source node to a target node which owns the memory corresponding to the cache block. The memory controller in the target node transmits Probe requests to the other nodes in the system to maintain coherency by changing the state of the cache block in those nodes and by causing a node including an updated copy of the cache block to send the cache block to the source node. Each node receiving a Probe request transmits a probe response (ProbeResp) packet to the source node.

If a probed node has a modified copy of the read data (i.e., dirty data), that node transmits a read response (RdResponse) packet and the dirty data to the source node. A node transmitting dirty data may also transmit a memory cancel (MemCancel) response packet to the target node in an attempt to cancel transmission by the target node of the requested read data. Additionally, the memory controller in the target node transmits the requested read data using a RdResponse response packet followed by the data in a data packet.

If the source node receives a RdResponse response packet from a probed node, the received read data is used. Otherwise, the data from the target node is used. Once each of the probe responses and the read data is received in the source node, the source node transmits a source done (SrcDone) response packet to the target node as a positive acknowledgement of the termination of the transaction.

A write transaction may be initiated using a sized write (Wr(Sized)) request or a victim block (VicBlk) request followed by a corresponding data packet. The Wr(Sized) request is used for non-cacheable writes or writes of data other than a cache block in size. To maintain coherency for Wr(Sized)requests, the memory controller in the target node transmits Probe requests to each of the other nodes in the system. In response to Probe requests, each probed node transmits a ProbeResp response packet to the target node. If a probed node is storing dirty data, the probed node responds with a RdResponse response packet and the dirty data. In this manner, a cache block updated by the Wr(Sized) request is returned to the memory controller for merging with the data provided by the Wr(Sized) request. The memory controller, upon receiving probe responses from each of the probed nodes, transmits a target done (TgtDone) response packet to the source node to provide a positive acknowledgement of the termination of the transaction. The source node replies with a SrcDone response packet.

A victim cache block which has been modified by a node and is being replaced in a cache within the node is transmitted back to memory using the VicBlk request. Probes are not needed for the VicBlk request. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk request and receipt of the TgtDone response packet (e.g. in response to an intervening probe).

A change to dirty (ChangetoDirty) request packet may be transmitted by a source node in order to obtain write permission for a cache block stored by the source node in a non-writeable state. A transaction initiated with a ChangetoDirty request may operate similar to a read transaction except that the target node does not return data. A validate block (ValidateBlk) request may be used to obtain write permission to a cache block not stored by a source node if the source node intends to update the entire cache block. No data is transferred to the source node for such a transaction, but otherwise operates similar to a read transaction.

A target start (TgtStart) response may be used by a target to indicate that a transaction has been started (e.g. for ordering of subsequent transactions). A no operation (NOP) info packet may be used to transfer flow control information between nodes (e.g., buffer free indications). A Broadcast request packet may be used to broadcast messages between nodes (e.g., to distribute interrupts). Finally, a synchronization (Sync) info packet may be used to synchronize node operations (e.g. error detection, reset, initialization, etc.).

Table 48 of FIG. 7 also includes a virtual channel (Vchan) column. The Vchan column indicates the virtual channel in which each packet travels (i.e., to which each packet belongs). In the present embodiment, four virtual channels are defined: a non-posted command (NPC) virtual channel, a posted command (PC) virtual channel, a response (R) virtual channel, and a probe (P) virtual channel.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (e.g., by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links (e.g. lines 18 in FIG. 1). However, since a receiving buffer is available prior to transmission, the virtual channels do not block each other even while using this shared resource.

Each different packet type (e.g. each different command field Cmd[5:0]) could be assigned to its own virtual channel. However, the hardware to ensure that virtual channels are physically conflict-free may increase with the number of virtual channels. For example, in one embodiment, separate buffers are allocated to each virtual channel. Since separate buffers are used for each virtual channel, packets from one virtual channel do not physically conflict with packets from another virtual channel (since such packets would be placed in the other buffers). It is noted, however, that the number of required buffers increases with the number of virtual channels. Accordingly, it is desirable to reduce the number of virtual channels by combining various packet types which do not conflict in a logical/protocol fashion. While such packets may physically conflict with each other when travelling in the same virtual channel, their lack of logical conflict allows for the resource conflict to be resolved without deadlock. Similarly, keeping packets which may logically conflict with each other in separate virtual channels provides for no resource conflict between the packets. Accordingly, the logical conflict may be resolved through the lack of resource conflict between the packets by allowing the packet which is to be completed first to make progress.

In one embodiment, packets travelling within a particular virtual channel on the coherent link from a particular source node to a particular destination node remain in order. However, packets from the particular source node to the particular destination node which travel in different virtual channels are not ordered. Similarly, packets from the particular source node to different destination nodes, or from different source nodes to the same destination node, are not ordered (even if travelling in the same virtual channel).

Packets travelling in different virtual channels may be routed through computer system 10 differently. For example, packets travelling in a first virtual channel from processing node 16A to processing node 16C may pass through processing node 16B, while packets travelling in a second virtual channel from processing node 16A to processing node 16C may pass through processing node 16D. Each node may include circuitry to ensure that packets in different virtual channels do not physically conflict with each other.

A given write transaction may be a "posted" write transaction or a "non-posted" write transaction. Generally speaking, a posted write transaction is considered complete by the source node when the write request and corresponding data are transmitted by the source node (e.g., by an interface within the source node). A posted write operation is thus effectively completed at the source. As a result, the source node may continue with other transactions while the packet or packets of the posted write transaction travel to the target node and the target node completes the posted write transaction. The source node is not directly aware of when the posted write transaction is actually completed by the target node. It is noted that certain deadlock conditions may occur in Peripheral Component Interconnect (PCI) I/O systems if packets associated with posted write transactions are not allowed to pass traffic that is not associated with a posted transaction.

In contrast, a non-posted write transaction is not considered complete by the source node until the target node has completed the non-posted write transaction. The target node generally transmits an acknowledgement to the source node when the non-posted write transaction is completed. Such acknowledgements consume interconnect bandwidth and must be received and accounted for by the source node. Non-posted write transactions may be required when the source node may need notification of when the request has actually reached its destination before the source node can issue subsequent transactions.

A non-posted Wr(Sized) request belongs to the NPC virtual channel, and a posted Wr(Sized) request belongs to the PC virtual channel. In one embodiment, bit 5 of the command field Cmd[5:0] is used to distinguish posted writes and non-posted writes. Other embodiments may use a different field to specify posted vs. non-posted writes.

In an exemplary embodiment, info packets are used to communicate between nearest neighbor nodes and can always be received by the receiving node. Hence info packets may not need buffering or flow control and may exist at a level of protocol under the packet transport layer of which the virtual channels are a part.

Non-Coherent Packets Within I/O Subsystem 14

FIG. 8 is a diagram of an exemplary non-coherent request packet 50 which may be employed within I/O subsystem 14. Request packet 50 includes command field Cmd[5:0] similar to command field Cmd[5:0] of the coherent request packet. Additionally, an optional source tag field SrcTag[4:0], similar to the source tag field SrcTag[4:0] of the coherent request packet, may be transmitted in bit time 2. The address may be transmitted in bit times 4–7 (and optionally in bit time 3 for the least significant address bits).

A unit ID field UnitID[4:0] in bit time 1 replaces the source node field SrcNode[2:0] of the coherent request packet. Unit IDs identify the logical source of the packets. An I/O node may have multiple unit IDs if, for example, the node includes multiple devices or functions which are logically separate. Accordingly, an I/O node may generate and accept packets having different unit IDs.

Additionally, request packet 50 includes a sequence ID field SeqID[3:0] transmitted in bit times 0 and 1. The sequence ID field SeqID[3:0] may be used to group a set of two or more request packets that are travelling in the same virtual channel and have the same unit ID. For example, if the SeqID field is zero, a packet is unordered with respect to other packets. If, however, the SeqID field has a non-zero value, the packet is ordered with respect to other packets in the same channel having a matching value in the SeqID field and the same UnitID.

Request packet 50 also includes a pass posted write (PassPW) bit transmitted in bit time 1. The PassPW bit indicates whether request packet 50 is allowed to pass posted write requests issued from the same unit ID. In an exemplary embodiment, if the PassPW bit is clear, the packet is not allowed to pass a previously transmitted posted write request packet. If the PassPW bit is set, the packet is allowed to pass prior posted writes. For read request packets, the command field Cmd[5:0] may include a bit having a state which indicates whether read responses may pass posted write requests. The state of that bit determines the state of the PassPW bit in the response packet corresponding to the read request packet.

FIG. 9 is a diagram of an exemplary non-coherent response packet 52 which may be employed within I/O subsystem 14. Response packet 52 includes the command field Cmd[5:0], the unit ID field UnitID[4:0], the source tag field SrcTag[4:0], and the PassPW bit similar to request packet 50 described above. Other bits may be included in response packet 52 as needed.

FIG. 10 is a table 54 listing different types of non-coherent request packets which may be employed within I/O subsystem 14. Other embodiments of I/O subsystem 14 are possible and contemplated, and may include other suitable sets of packets and command field encodings. Table 54 includes a command (CMD) code column listing the command encodings assigned to each non-coherent command, a virtual channel (Vchan) column defining the virtual channel to which the non-coherent packets belong, a command (Command) column including a mnemonic representing the command, and a packet type (Packet Type) column indicating which of packets 40, 50, and 52 (and data packet 46 where specified) is employed for that command.

The NOP, Wr(Sized), Read(Sized), RdResponse, TgtDone, Broadcast, and Sync packets may be similar to the corresponding coherent packets described with respect to FIG. 7. However, within I/O system 14, neither probe request nor probe response packets are issued. Posted/non-posted write operations may again be identified by the value of bit 5 of the Wr(Sized) request, as described above, and TgtDone response packets may not be issued for posted writes.

A Flush request may be issued by an I/O node 24 to ensure that one or more previously issued posted write requests have been observed at host memory. Generally, since posted requests are completed (e.g. the corresponding TgtDone response is received) on the requester node interface prior to completing the request on the target node interface, the requester node cannot determine when the posted requests have been flushed to their destination within the target node interface. A Flush applies only to requests in the same I/O stream as the Flush and may only be issued in the upstream direction. To perform its function, the Flush request travels in the non-posted command virtual channel and pushes all requests in the posted command channel ahead of it (i.e., via the PassPW bit). Thus, executing a Flush request (and receiving the corresponding TgtDone response packet) provides a means for the source node to determine that previous posted requests have been flushed to their destinations within the coherent fabric.

The Fence request provides a barrier between posted writes which applies across all UnitIDs in the I/O system. A Fence request may only be issued in the upstream direction and travels in the posted command virtual channel. The Fence pushes all posted requests in the posted channel ahead of it. For example, if the PassPW bit is clear, the Fence packet will not pass any packets in the posted channel, regardless of the packets UnitID. Other packets having the PassPW bit clear will not pass a Fence packet regardless of UnitID.

Packet Ordering Rules Within I/O Subsystem 14

As described above, non-coherent packets transmitted within I/O subsystem 14 are either transmitted in an upstream direction toward host bridge 28 or in a downstream direction away from host bridge 28, and may pass through one or more intermediate I/O nodes 24. Host bridge 28 receives non-coherent memory request packets from I/O subsystem 14, translates the non-coherent memory request packets to corresponding coherent request packets, and issues the coherent request packets within processing subsystem 12. In an exemplary embodiment, certain transactions must be completed in the order in which they were generated to preserve memory coherency within computer system 10 and to adhere to certain I/O ordering requirements expected by I/O devices. For example, PC I/O systems may define certain ordering requirements to assure deadlock-free operation. Accordingly, each processing node 16 and I/O node 24 implements ordering rules with regard to memory operations to preserve memory coherency within computer system 10 and to adhere to I/O ordering requirements.

Certain combinations of virtual channels may have ordering collisions and, thus, may have certain passing requirements. For example, FIG. 11 illustrates a table 56 listing ordering rules which may be implemented with respect to required interactions between packets traveling in specific combinations of virtual channels of I/O subsystem 14. As shown in FIG. 10, sized read requests, non-posted sized write request and data packets, and Flush request packets travel in the non-posted command (NPC) virtual channel. Posted sized write request and data packets and broadcast messages travel in the posted command (PC) virtual channel, and response packets travel in the response (R) virtual channel.

Host bridge 28 is the destination of packets traveling upstream within I/O subsystem 14, and the unit ID field UnitID[4:0] of packets traveling upstream contain the unit ID of the requester I/O node 24. The unit ID field UnitID[4:0] of response packets traveling downstream contain the unit ID of the target I/O node 24. On the other hand, the unit ID field UnitID[4:0] of request packets traveling downstream contain the unit ID of host bridge 28 (e.g., "00000"). In one embodiment, packets having the same unit ID are assumed to be part of the same "I/O stream". Therefore, all packets traveling downstream may be assumed to be in the same I/O stream. Generally, an "I/O stream" is a group of packets, and I/O streams are treated as being independent within computer system 10.

I/O nodes 24 within I/O subsystem 14 implement the following upstream ordering rules regarding packets in the non-posted command (NPC) channel, the posted command (PC) channel, and the response (R) channel:

1) packets from different source I/O nodes are in different I/O streams and are not ordered with respect to one another,
2) packets in the same I/O stream and virtual channel that are part of a sequence (i.e., have matching nonzero SeqIDs) are strongly ordered, and may not pass each other, and
3) packets from the same source I/O node (i.e., traveling in the same I/O stream), but not in the same virtual channel or not part of a sequence, may be forwarded ahead of (i.e., pass) other packets according to table 56 in FIG. 11.

In table 56 of FIG. 11, a "No" entry indicates a subsequently issued request/response packet listed in the corresponding row of table 56 is not allowed to pass a previously issued request/response packet listed in the corresponding column of table 56. For example, request and/or data packets of a subsequently issued non-posted write transaction are not allowed to pass request and/or data packets of a previously issued posted write transaction if the PassPW bit is clear (e.g., a "0") in the request packet of the subsequently issued non-posted write request transaction. Such "blocking" of subsequently issued requests may be required to ensure proper ordering of packets is maintained. It is noted that allowing packets traveling in one virtual channel to block packets traveling in a different virtual channel represents an interaction between the otherwise independent virtual channels within I/O subsystem 14.

A "Yes" entry in table 56 indicates a subsequently issued request/response packet listed in the corresponding row of table 56 cannot be blocked by a previously issued request/response packet listed in the corresponding column of table 56. For example, request and/or data packets of a subsequently issued posted write transaction pass request and/or data packets of a previously issued non-posted write transaction. In an exemplary embodiment, such passing ensures prevention of a deadlock situation within computer system 10.

An "X" entry in table 56 indicates that there are no ordering requirements between a subsequently issued request/response packet listed in the corresponding row of table 56 and a previously issued request/response packet listed in the corresponding column of table 56. For example, there are no ordering requirements between request and/or data packets of a subsequently issued non-posted write transaction and request and/or data packets of a previously issued non-posted write transaction. The request and/or data packets of the subsequently issued non-posted write transaction may be allowed to pass the request and/or data packets of the previously issued non-posted write transaction if there is any advantage to doing so.

I/O Transaction Ordering Rules Within Processing Subsystem 12

As described above, host bridge 28 within processing node 16C translates packets between processing subsystem 12 and I/O subsystem 14. Turning now to FIG. 12, a table 58 is shown illustrating operation of one embodiment of host bridge 28 in response to a pair of ordered requests received from a particular unit within the non-coherent fabric. The only ordering rule provided by the coherent fabric itself is that packets travelling in the same virtual channel, from the same source to the same destination, are guaranteed to remain in order. However, due to the distributed nature of the coherent fabric, I/O streams entering the coherent fabric may be spread over multiple targets. Thus, to guarantee ordering from the point of view of all observers, the host bridge waits for responses to prior packets before issuing new packets into the coherent fabric. In this manner, the host bridge may determine that the prior packets have progressed far enough into the coherent fabric for subsequent packets to be issued without disturbing ordering.

The host bridge 28 may determine which of the packets coming from the non-coherent fabric have ordering requirements. Such a determination may be accomplished by examining the command encoding, UnitID, SeqID, PassPW fields in each of the packets, and applying the rules from table 56. Unordered packets require no special action by the host bridge; they may be issued to the coherent fabric in any order as quickly as the host bridge can send them out. Ordered packets, on the other hand, have various wait requirements which are listed in table 58.

Table 58 includes a Request, column listing the first request of the ordered pair, a Request$_2$ column listing the second request of the ordered pair, and a wait requirements column listing responses that must be received before the host bridge 28 may allow the second request to proceed.

Unless otherwise indicated in table 58, the referenced packets are on the coherent fabric. Also, in an exemplary embodiment, combinations of requests which are not listed in table 58 do not have wait requirements. Still further, table 58 applies only if host bridge 28 first determines that ordering requirements exist between two request packets. For example, ordering requirements may exist if the two request packets have matching non-zero sequence IDs, or if the first request packet is a posted write and the second request has the PassPW bit clear.

In the first entry of table 58, a pair of ordered memory write requests are completed by the host bridge 28 by delaying transmission of the second memory write request until a TgtStart packet corresponding to the first memory write request is received in the coherent fabric by the host bridge 28. Additionally, the host bridge 28 withholds a SrcDone packet corresponding to the second memory write request until a TgtDone packet corresponding to the first memory write request has been received. Finally, the TgtDone packet corresponding to the second memory write request on the non-coherent link (if the memory write is a non-posted request) is delayed until the TgtDone packet corresponding to the first memory write request has been received from the coherent fabric. The other entries in the table of FIG. 12 may be interpreted in a manner similar to the description given above for the first entry.

Thus, in general, I/O subsystem 14 provides a first transaction Request$_1$ and a second transaction Request$_2$ to host bridge 28, wherein the Request$_2$ follows Request$_1$. Host bridge 28 dispatches Request$_1$ within processing subsystem 12. Host bridge 28 may dispatch Request$_2$ within processing subsystem 12 dependent upon the progress of Request$_1$ within processing subsystem 12. Alternately, host bridge 28 may delay completion of Request$_2$ with respect to Request$_1$.

Figure 13:
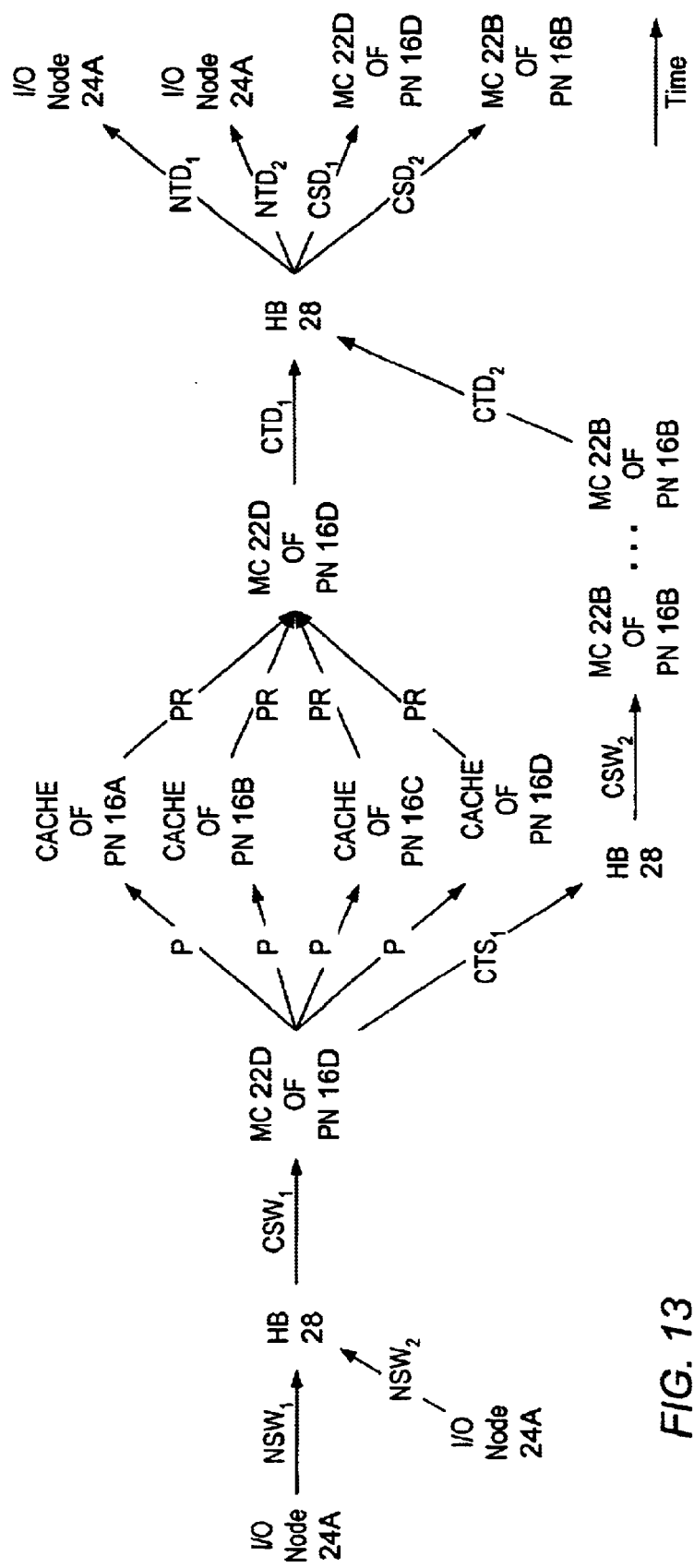
FIG. 13 is a diagram illustrating the events associated with an exemplary ordered pair of write transactions as a function of time, wherein the write transactions originate within the I/O subsystem and enter the processing subsystem.

Turning now to FIG. 13, FIG. 13 illustrates the events associated with an exemplary ordered pair of write transactions as a function of time. The first write transaction of the ordered pair is generated by I/O node 24A as a non-coherent write request NSW$_1$ followed by a data packet with data to be stored within memory 20D coupled to processing node 16D. The second write transaction of the ordered pair is generated by I/O node 24A as a non-coherent write request NSW$_2$ followed by a data packet with data to be stored within memory 20B coupled to processing node 16B. Both the first and second write transactions are directed to host bridge 28 within processing node 16C. The first write transaction is generated before the second write transaction and is received by host bridge 28 before the second write transaction. The first and second write transactions may be posted write transactions or non-posted write transactions. In this example, it will be assumed that processing nodes 16A–16D include caches similar to cache 38 as described above.

FIG. 14 is a diagram of an exemplary non-coherent sized write request packet format, which the includes the command field Cmd[5:0], the unit ID field UnitID[4:0], the sequence ID field SeqID[3:0], the PassPW bit, the source tag field SrcTag[4:0] and the address field Addr[39:2] described above. Command field Cmd[5:0] contents of may identify the request as a write request. Bit [5] of Cmd[5:0] may indicate whether determine if the write request is posted or non-posted. For example, when Cmd[5:0] contains 001xxx, the request packet may be a non-posted write request packet, and when Cmd[5:0] contains 101xxx, the request packet may be a posted write request packet. The unit ID field UnitID[4:0] identifies the requester I/O node, and Addr[39:2] identifies the address to be accessed by the write transaction.

The non-coherent sized write request packet of FIG. 14 also includes a mask/count field Mask/Count [3:0] and a compatibility bit Compat. The mask/count field either indicates which bytes within a data unit (e.g., 32-bit doubleword) are to be read (mask), or encodes the number of data units to be transferred (count). The compatibility bit Compat is a routing bit used with legacy hardware.

I/O node 24A transmits the packets of the first write transaction upstream to processing node 16C via noncoherent communication link 26A. Interface 32 of processing node 16C receives the packets of the first write transaction and provides the information contained within the packets of the first write transaction to packet processing logic 34. Host bridge 28 within packet processing logic 34 uses the address and the memory map described above to determine the target of the write transaction (i.e. processing node 16D). Host bridge 28 translates $NSW_1$ to a first coherent sized write transaction $CSW_1$, wherein $CSW_1$ identifies processing node 16D as the target. In doing so, host bridge 28 translates the non-coherent request packet of $NSW_1$ to a coherent request packet of $CSW_1$. If necessary, host bridge 28 may also translate the non-coherent data packets of $NSW_1$ to coherent data packets of $CSW_1$.

FIG. 15 is a diagram of an exemplary coherent sized write request packet format. The coherent sized write request packet of FIG. 15 includes the command field Cmd[5:0], the destination node field DestNode[2:0], the destination unit field DestUnit[1:0], the source node field SrcNode[2:0], the source unit field SrcUnit[1:0], the source tag field SrcTag[4:0], the address field Addr[39:2], the mask/count field Mask/Count[3:0], and the compatibility bit Compat described above.

Host bridge 28 generates the $CSW_1$ request packet with the contents of DestNode[2:0] and DestUnit [1:0] identifying memory controller 22D of processing node 16D as the target, the contents of SrcUnit [1:0] and SrcNode[2:0] identifying host bridge 28 of processing node 16C as the source of $CSW_1$, and the contents of SrcTag[4:0] being a source tag of processing node 16C.

Figure 16:
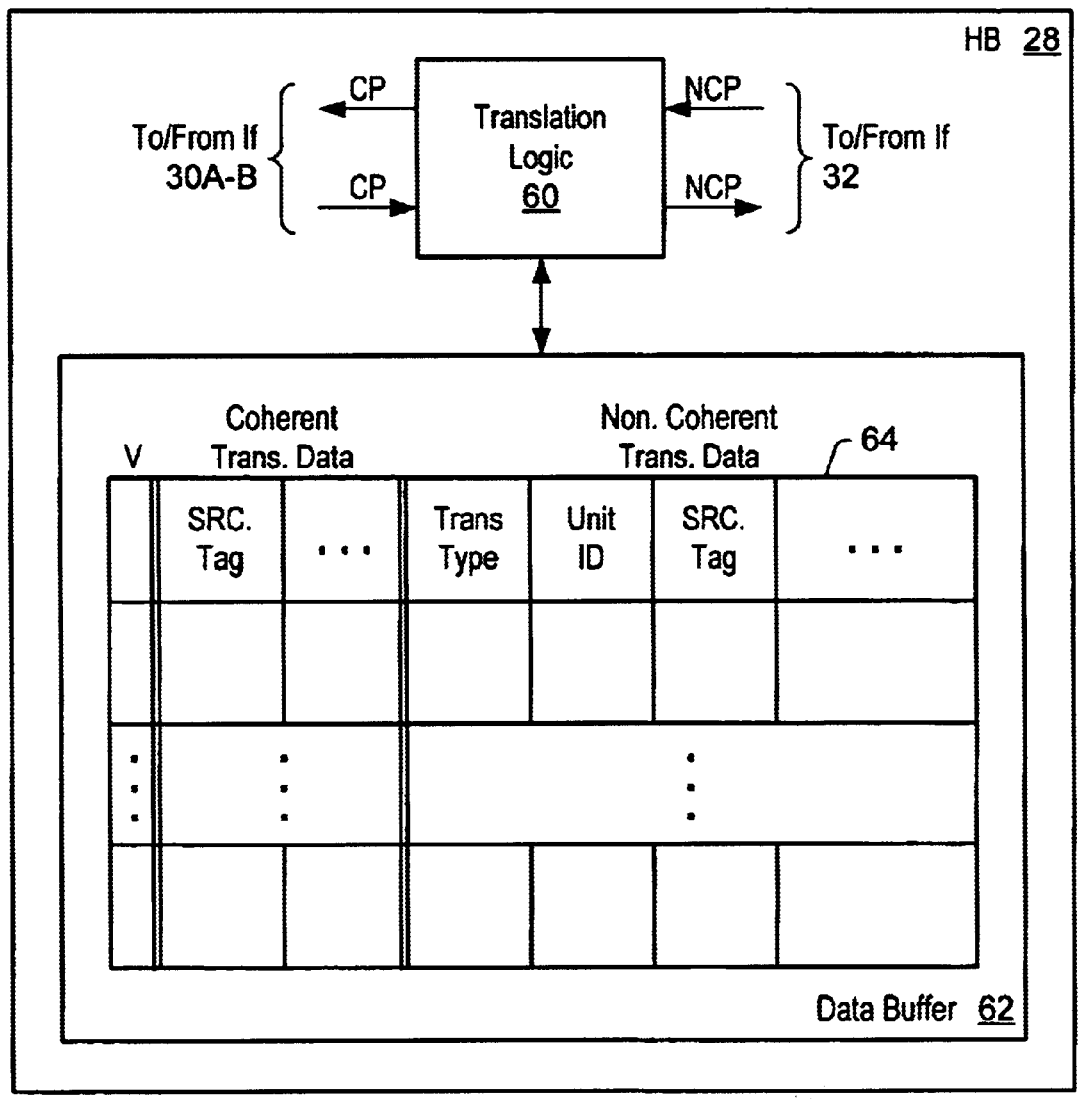
FIG. 16 is a diagram of one embodiment of the host bridge of FIGS. 1 and 2, wherein the host bridge includes translation logic coupled to a data buffer.

FIG. 16 is a diagram of one embodiment of host bridge 28 of FIGS. 1 and 2. In the embodiment of FIG. 16, host bridge 28 includes translation logic 60 coupled to a data buffer 62. Translation logic 60 translates non-coherent packets (NCPs), sourced within I/O subsystem 14 and having a target within processing subsystem 12, to corresponding coherent packets (CPs). Translation logic 60 also translates coherent packets, sourced within processing subsystem 12 and having a target within I/O subsystem 14, to corresponding non-coherent packets. Translation logic 60 may store coherent and/or non-coherent data associated with transactions sourced in one subsystem and having a target in the other subsystem within data buffer 62.

Data buffer 62 may store the transaction data in the form of a table 64 having multiple entries. Each entry may include a valid bit V, a SOURCE TAG field in a portion of table 64 associated with coherent transaction data, and a TRANSACTION TYPE, UNIT ID, and SOURCE TAG fields in a portion of table 64 associated with non-coherent transaction data. Valid bit V may indicate whether the corresponding entry is valid. For example, valid bit V may have a value of "1" if the corresponding entry is valid, and may have a value of "0" if the corresponding entry is invalid. The SOURCE TAG field in the portion of table 64 associated with coherent transaction data may be used to store a source tag of processing node 16C assigned to the coherent transaction by host bridge 28. The TRANSACTION TYPE field may contain a value indicating the type of transaction. The UNIT ID field may contain a value identifying the I/O node which initiated the transaction. The SOURCE TAG field in the portion of table 64 associated with noncoherent transaction data may be used to store a source tag of processing node 16C assigned to the non-coherent transaction by a source I/O node. As indicated in FIG. 16, other information may be stored within table 64.

Translation logic 60 translates the $NSW_1$ request packet to the $CSW_1$ request packet identifying processing node 16D as the target. Translation logic 60 may also translate the non-coherent data packets of $NSW_1$ to coherent data packets of $CSW_1$.

Translation logic 60 stores coherent and non-coherent data associated with the first write transaction within data buffer 62. Translation logic 60 may use the contents of Cmd[5:0] to determine the type of transaction, and may assign a corresponding value to a TRANSACTION TYPE identifier. It is noted that translation logic 60 distinguishes between posted and non-posted first write transactions, and assigns different values to the TRANSACTION TYPE identifier in each case. Translation logic 60 may provide the contents of SrcTag[4:0] of the first non-coherent sized write transaction $CSW_1$, the contents of SrcTag[4:0] assigned by host bridge 28 to $CSW_1$, and the TRANSACTION TYPE identifier and the contents of the unit ID field UnitID[4:0] of the non-coherent write request packet to data buffer 62. Data buffer 44 may store the contents of SrcTag[4:0] of CSW, within the SOURCE TAG field of the coherent transaction data portion of an available (e.g., invalid) entry within table 64. Data buffer 44 may store the value of the TRANSACTION TYPE identifier within the TRANSACTION TYPE field of the entry, and the contents of the unit ID field UnitID[4:0] within the UNIT ID field of the entry. Data buffer 44 may also store the contents of SrcTag[4:0] of the first non-coherent sized write transaction $CSW_1$ within the SOURCE TAG field of the non-coherent transaction data portion of the entry. Data buffer 44 may also set valid bit V of the entry to 1 to indicate that the entry is valid.

Upon receipt of the second write transaction, $NSW_2$, translation logic 60 translates the $NSW_2$ request packet to a request packet of a second coherent sized write transaction $CSW_2$, wherein the request packet of $CSW_2$ identifies processing node 16B as the target. Translation logic 60 may also translate any non-coherent data packets of $NSW_2$ to coherent data packets of $CSW_2$. Translation logic 60 stores coherent and non-coherent data associated with the second write transaction within data buffer 62 as described above.

Before issuing the second write transaction to the coherent fabric, host bridge 28 determines whether ordering requirements exist between the first write transaction and the second write transaction by examining the command encoding, UnitID, SeqID, and PassPW fields in each of the request packets. If no ordering requirements exist (e.g., the two transactions have non-matching UnitIDs), the host bridge 28 may issue the coherent packets corresponding to the second write transaction to the coherent fabric as quickly as possible. If, however, the fields of the non-coherent packets indicate that the packets must be ordered with respect to each other, the host bridge 18 delays issuance to the coherent fabric of the second write transaction in accordance with the wait requirements listed in table 58.

For example, ordering requirements exist between two transactions issued from the same source (i.e., the transactions have matching non-zero SeqIDs). Further, the virtual channels in which the packets are travelling also are indicative of ordering requirements. Thus, in an exemplary embodiment, two non-posted transactions have ordering requirements if they have the same non-zero SeqID. Two posted transactions have ordering requirements only if the second posted transaction has its PassPW bit clear, or if the two transactions have a matching non-zero SeqID. On the other hand, a posted transaction following a non-posted transaction always is allowed to pass the non-posted transaction. Further, a second non-posted transaction following a first posted transaction is allowed to pass if the PassPW bit in the second non-posted transaction is set.

Returning to the example in FIG. 13, host bridge 28 has determined that ordering requirements exist between $NSW_2$ and $NSW_1$, which have both been issued by I/O node 24A. Thus, in accordance with the wait requirements set forth in table 58, host bridge 28 delays providing the packets of $CSW_2$ to packet processing logic 34 for issuance until a first coherent target start ($CTS_1$) response packet is received from the target of $CSW_1$.

As illustrated in FIG. 13, and with reference to FIG. 2, host bridge 28 provides the packets of $CSW_1$ (i.e., the first coherent sized write request packet and the one or more coherent data packets) to packet processing logic 34 for issuance. Packet processing logic 34 provides the packets of $CSW_1$ to interface 30B. Interface 30B transmits the packets of the first write transaction to processing node 16D via communication link 18C. The packet processing logic of processing node 16D uses the contents of the destination node field DestNode[2:0] and the destination unit field DestUnit[1:0] to determine that memory controller 22D is to receive the first write transaction, and provides the information contained within the packets of the first write transaction to memory controller 22D.

Memory controller 22D broadcasts probe request packets (P) to all processing nodes 16A–16D of processing subsystem 12. Memory controller 22D properly orders $CSW_1$ with respect to other pending operations within memory controller 22D, and signals host bridge 28 that $CSW_1$ is properly ordered (i.e., serialized) with respect to other pending operations within the target via the $CTS_1$ response packet.

The first row in Table 58 of FIG. 12 is directed to an ordered pair of write transactions originating within I/O subsystem 14 and entering processing subsystem 12. There are three wait requirements associated with the ordered pair of write transactions. The first wait requirement states "$Cmd_2$ must wait for $TgtStart_1$." In this example, the second coherent sized write transaction $CSW_2$ must wait for the first coherent target start $CTS_1$ response packet.

Upon receiving the $CTS_1$ response packet, host bridge 28 provides the packets of $CSW_2$ (i.e., the second coherent sized write request packet and the one or more coherent data packets) to packet processing logic 34 for issuance. Packet processing logic 34 provides the packets of $CSW_2$ to interface 30B. Interface 30B transmits the packets of the second write transaction to processing node 16B via communication link 18B. The packet processing logic of processing node 16B uses the contents of the destination node field DestNode [2:0] and the destination unit field DestUnit[1:0] to determine that memory controller 22B is to receive the second write transaction, and provides the information contained within the packets of the second write transaction to memory controller 22B.

Upon receiving a probe request packet, the packet processing logic within each processing node directs the probe request information to the cache within the processing node. If a cache receiving a probe request includes data associated with the address information of the probe request, but the data has not been modified, the cache invalidates the data and returns a probe response (PR) packet. On the other hand, if the cache includes modified data associated with the address information of the probe request, the cache returns the modified data via a read response transaction. The read response transaction includes a read response packet followed by a data packet including the modified data.

FIG. 17 is a diagram of one embodiment of a probe request packet. The probe request packet of FIG. 17 includes the source node field SrcNode[2:0], the source unit field SrcUnit[1:0], the command field Cmd[5:0], the source tag field SrcTag[4:0], and the address field Addr[39:3] described above, along with a target node field TgtNode[2:0] and a target unit field TgtUnit[1:0]. The source node and source unit fields contain values identifying the node and unit which initiated the request that caused issuance of the probe request (i.e., host bridge 28 in processing node 16C). The target node field TgtNode [2:0] and the target unit field TgtUnit [1:0] contain values identifying the original target of the request (i.e., memory controller 22D of processing node 16D). A destination node for the probe request need not be provided in the probe packet since a probe is a broadcast transmitted to all destinations in processing subsystem 12. The command field Cmd[5:0] contains a value which identifies the packet as a probe request. The command field may further include a bit (e.g., bit 0) having a state which indicates whether probe responses should be sent to SrcNode/SrcUnit (i.e., the original requester) or TgtNode/TgtUnit (i.e., the source of the probe request). The contents of SrcTag[4:0] is the source tag associated with the original request, which, in this instance, originated from the host bridge 28. Addr[39:3] identifies the address accessed by the write request.

FIG. 18 is a diagram of one embodiment of a probe response packet. The probe response packet of FIG. 18 includes the source node field SrcNode[2:0], the source unit field SrcUnit[1:0], the command field Cmd[5:0], the destination node field DestNode[2:0], the destination unit field DestUnit[1:0], and the source tag field SrcTag[4:0] described above. The source node and source unit fields contain values identifying the requester node which initiated the original transaction. The command field Cmd[5:0] contains a value which identifies the packet as a probe response. The destination unit and destination node fields contain values identifying the destination of the response (i.e., memory controller 22D of processing node 16D). The contents of SrcTag[4:0] is a source tag of the processing node issuing the probe response.

Returning to FIG. 13, memory controller 22D receives a probe response (PR) from each processing node 16A–1 6D. If one or more of the probe responses are read responses, memory controller 22D merges the write data of $CSW_1$ with the data of the read responses. At this point, $CSW_1$ is properly ordered within memory controller 22D with respect to other pending operations within memory controller 22D, and a correct coherency state with respect to $CSW_1$ has been established within the other processing nodes 16A–16C. The first coherent sized write transaction $CSW_1$ has reached a "point of coherency" within processing subsystem 12, and memory controller 22D transmits a first coherent target done ($CTD_1$) response packet to host bridge 28.

FIG. 19 is a diagram of one embodiment of a coherent target done response packet. The coherent target done response packet of FIG. 19 includes the source node field SrcNode[2:0], the source unit field SrcUnit[1:0], the command field Cmd[5:0], the destination node field DestNode [2:0], the destination unit field DestUnit[1:0], and the source tag field SrcTag[4:0] described above.

The source node and source unit fields contain values identifying the requester of the original transaction. The command field Cmd [5:0] contains a value which identifies the packet as a coherent target done response. The destination node field DestNode[2:0] contains a value identifying processing node 16C (e.g., the NodeID of processing node 16C) as the destination of the coherent target done response packet. The destination unit field DestUnit[1:0] contains a value identifying host bridge 28 as the destination unit of the coherent target done response. The contents of SrcTag[4:0] is the source tag originally assigned to the write transaction by host bridge 28 (i.e., the source tag of the original coherent sized write request packet generated by host bridge 28). The coherent target done response packet of FIG. 19 further includes several fields reserved for future use Rsv and an error bit Error which indicates whether the preceding probe request resulted in an error.

Returning to FIG. 13, it is noted that when memory controller 22D transmits the $CTD_1$ response packet to host bridge 28, $CSW_1$ has at least reached the point of coherency within processing subsystem 12, and $CSW_1$ may or may not have been actually completed. In other words, when memory controller 22D transmits the coherent target done ($CTD_1$) response packet, $CSW_1$ has been properly ordered with respect to other pending operations, and a correct coherency state with respect to $CSW_1$ has been established in the other processing nodes. However, memory controller 22D may or may not have actually stored the data associated with $CSW_1$ within memory 20D.

With regard to $CSW_2$, memory controller 22B broadcasts probe request packets (P) to all processing nodes 16A–16D of processing subsystem 12 and may transmit a second coherent target start ($CTS_2$) response packet to host bridge 28. Memory controller 22B receives a probe response (PR) from each processing node 16A–16D. If one or more of the probe responses are read responses, memory controller 22B merges the write data of $CSW_2$ with the data of the read responses. At this point, memory controller 22B has properly ordered $CSW_2$ with respect to other pending operations within memory controller 22B, and a correct coherency state with respect to $CSW_2$ has been established within the other processing nodes 16A–16C. The second coherent sized write transaction $CSW_2$ has reached a point of coherency within processing subsystem 12, and memory controller 22B transmits a second coherent target done ($CTD_2$) response packet to host bridge 28.

Processing node 16D transmits the $CTD_1$ packet to processing logic 34 of processing node 16C via communication link 18C and interface 30B. Translation logic 60 of host bridge 28 provides the contents of the source tag field SrcTag[4:0] of the target done response packet to data buffer 62. Data buffer 62 searches table 64 for a corresponding entry having a SOURCE TAG field within the coherent transaction data portion and containing a value which matches the contents of the source tag field SrcTag[4:0]. When data buffer 62 locates the corresponding entry within table 64, data buffer 62 may provide data from the non-coherent transaction data portion of the corresponding entry to translation logic 60, then invalidate the corresponding entry (e.g., by setting the valid bit V of the corresponding entry to "0"). Similarly, processing node 16B transmits the $CTD_2$ packet to processing logic 34 of processing node 16C via communication link 18B and interface 30A.

After receipt of the $CTD_1$ packet, host bridge 28 issues a first coherent source done ($CSD_1$) response packet to memory controller 22D. Host bridge 28 may release any buffers involved with the first write transaction upon issuing the $CSD_1$ response packet. Memory controller 22D may release any buffers involved with the first write transaction upon receiving the $CSD_1$ response packet. Similarly, after the receipt of the $CTD_2$ packets, host bridge 28 issues a second coherent source done ($CSD_2$) response packet to memory controller 22B. Host bridge 28 may release any buffers involved with the second write transaction upon issuing the $CSD_2$ response packet. Memory controller 22B may release any buffers involved with the second write transaction upon receiving the $CSD_2$ response packet.

The second wait requirement in the first row in Table 58 of FIG. 12 states "$SrcDone_2$ must wait for $TgtDone_1$." In the example of FIG. 13, host bridge delays issuing the second coherent source done $CSD_2$ response packet until the first coherent target done $CTD_1$ response packet has been received. The third wait requirement in the first row in Table 58 of FIG. 12 states "TgtDone2 on the non-coherent link (if required) must wait for TgtDone1." In this example, a second non-coherent target done $NTD_2$ response packet must wait for $CTD_1$.

If host bridge 28 receives the $CTD_1$ response packet before the $CTD_2$ response packet, host bridge 28 responds to the $CTD_1$ response packet by issuing the first coherent source done $CSD_1$ response packet to memory controller 22D. If the first write transaction is a non-posted write transaction, host bridge 28 also responds to the $CTD_1$ response packet by issuing a first non-coherent target done ($NTD_1$) response packet directed to I/O node 24A. When the $CTD_2$ response packet is later received, host bridge 28 responds to the $CTD_2$ response packet by issuing the second coherent source done $CSD_2$ response packet to memory controller 22B. If the second write transaction is a non-posted write transaction, host bridge 28 also responds to the $CTD_2$ response packet by issuing the second non-coherent target done ($NTD_2$) response packet directed to I/O node 24A.

On the other hand, if host bridge 28 receives the $CTD_2$ response packet before the $CTD_1$ response packet, host bridge 28 delays issuing the $CSD_2$ response packet until the $CTD_1$ response packet is received. If the second write transaction is a non-posted write transaction, host bridge 28 also delays issuing the $NTD_2$ response packet until the $CTD_1$ response packet is received. Host bridge 28 responds to the $CTD_1$ response packet by issuing the $CSD_1$ response packet to memory controller 22D. If the first write transaction is a non-posted write transaction, host bridge 28 also responds to the $CTD_1$ response packet by issuing the $NTD_1$ response packet to I/O node 24A. Host bridge 28 responds to the received $CTD_1$ and $CTD_2$ response packets by issuing the $CSD_2$ response packet to memory controller 22B. If the second write transaction is a non-posted write transaction, host bridge 28 responds to the received $CTD_1$ and $CTD_2$ response packets by issuing the $NTD_2$ response packet to I/O node 24A.

Host bridge 28 may generate the non-coherent target done response packets, or may translate the coherent target done response packets received from the processing nodes to form the non-coherent target done response packets. FIG. 20 is a diagram of one embodiment of a non-coherent target done response packet. The non-coherent target done response packet of FIG. 20 includes the command field Cmd[5:0], the unit ID field UnitID[4:0], the PassPW bit, the error bit Error, and the source tag field SrcTag[4:0] described above. The command field Cmd[5:0] contains a value which identifies the packet as a non-coherent target done response. The unit ID field UnitID[4:0] is the value of the UNITID field obtained from the non-coherent transaction data portion of the corresponding entry within table 64. The coherent target done response packet of FIG. 20 also includes a bridge bit Bridge and several fields reserved for future use Rsv. The value of the bridge bit Bridge indicates whether the response packet was transmitted by host bridge 28, and is used to distinguish responses travelling upstream from responses traveling downstream. In this case, the value of bridge bit Bridge indicates that the response packet was transmitted by host bridge 28.

FIG. 21 is a diagram of one embodiment of a coherent source done response packet. The coherent source done response packet of FIG. 21 includes the source node field SrcNode[2:0], the source unit field SrcUnit[1:0], the command field Cmd[5:0], the destination node field DestNode[2:0], the destination unit field DestUnit[1:0], and the source tag field SrcTag[4:0] described above. The SrcNode[2:0] and SrcUnit [1:0] fields contain values identifying processing node 16C and host bridge 28 as the requester which initiated the transaction. The command field Cmd[5:0] contains a value which identifies the packet as a coherent source done response. The destination node field DestNode[2:0] contains a value identifying a processing node as the destination of the coherent source done response packet. The destination unit field DestUnit[1:0] contains a value identifying a unit (e.g., a memory controller) as the destination unit of the coherent source done response. The contents of SrcTag[4:0] is the source tag associated with the original request. The coherent source done response packet of FIG. 21 also includes several fields reserved for future use Rsv, an error bit Error which indicates whether an error is associated with the transaction, and a Cancel bit used when the source done response packet is issued in response to a read transaction to a line modified in a processing unit's cache.

Returning to FIG. 13, it is noted that TgtStart response packets such as $CTS_1$ are optional within computer system 10. Thus reception of any other response packet (e.g., a TgtDone or RdResponse response packet) from a target by host bridge 28 may serve to satisfy the wait requirement for the TgtStart response packet. For example, the first wait requirement in the first row of table 58 of FIG. 12 states: "$Cmd_2$ must wait for $TgtStart_1$." Should host bridge 28 receive the first coherent target done $CTD_1$ response packet from memory controller 22D before the first coherent target start response packet $CTS_1$, host bridge 28 may assume that $CTS_1$ will not be forthcoming, and issue the second coherent sized write transaction $CSW_2$. Thus the reception of $CTD_1$ satisfies the wait requirement for the TgtStart response packet $CTS_1$.

Figures 22, 23:
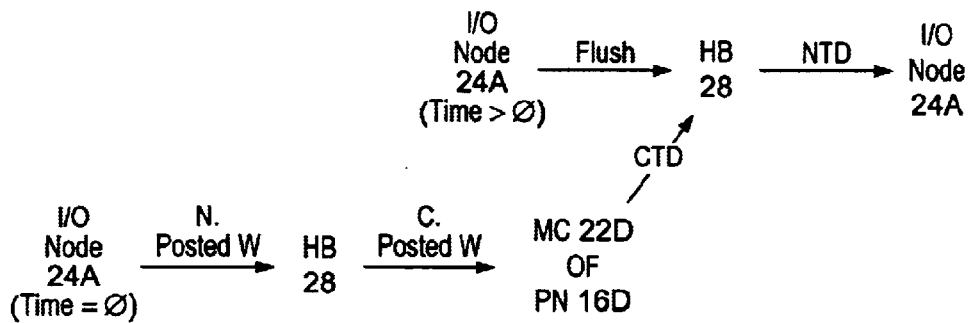
FIG. 22 is a diagram illustrating the events associated with an exemplary posted write transaction followed by a Flush request as a function of time.
FIG. 23 is a diagram of one embodiment of a non-coherent Flush request packet.

FIGS. 22 and 23 will now be used to describe an exemplary situation in which host bridge 28 dispatches a first received I/O transaction $Request_1$ within processing subsystem 12, and delays completion of a second received I/O transaction $Request_2$ with respect to $Request_1$. In the sixth row of table 58 of FIG. 12, I/O subsystem 14 provides a memory write transaction ($Request_1$) and a Flush request ($Request_2$) to host bridge 28, wherein the Flush request follows the memory write transaction. FIG. 22 is a diagram illustrating the events associated with an exemplary posted write transaction followed by a Flush request as a function of time. The posted write transaction is generated by I/O node 24A and includes data to be stored within memory 20D coupled to processing node 16D. The Flush request is generated by I/O node 24A subsequent to the posted write transaction, and is received by host bridge 28 after the write transaction. In this example, it will be assumed that processing nodes 16A–16D include caches similar to cache 38 as described above.

An I/O node 24 of I/O subsystem 14 (e.g., I/O node 24A) may issue one or more posted write requests to garner the performance advantage associated with posted write transactions over non-posted write transactions. Subsequently, the I/O node may transmit a Flush request. A transaction done response received by the I/O node in response to the Flush request signifies that all of the posted write transactions previously issued by the I/O node have reached points of coherency with respect to other pending transactions such that memory coherency is preserved within computer system 10.

FIG. 23 is a diagram of one embodiment of a non-coherent Flush request packet. The non-coherent Flush packet of FIG. 23 includes the command field Cmd[5:0], the PassPW bit, the unit ID field UnitID[4:0], and the source tag field SrcTag[4:0] described above. The command field Cmd [5:0] contains a value which identifies the packet as a Flush request. Flush packets are transmitted in the non-posted command (NPC) virtual channel. The PassPW bit is set to a value (e.g., "0") which indicates that packets in the posted command virtual channel and received ahead of the Flush request packet must be acted upon ahead of the Flush request. The unit ID field UnitID[4:0] contains a value associated with the source I/O node 24A (e.g., the UnitID of the source I/O node 24A). The source tag field SrcTag[4:0] is a transaction tag assigned by the source I/O node 24A. The non-coherent Flush packet of FIG. 11 also includes a sequence ID field SeqID[3:0] defined above and several fields reserved for future use Rsv. The SeqID field typically contains a zero value because a Flush generally is not part of an ordered sequence.

As indicated in FIG. 22, I/O node 24A transmits a non-coherent Flush request packet to host bridge 28 as described above. Translation logic 60 of host bridge 28 provides the contents of the unit ID field UnitID[4:0] of the non-coherent Flush packet to data buffer 62. Data buffer 62 searches valid entries of table 64 for a UNIT ID field containing a value which matches the contents of the UnitID [4:0]field.

For clarity, valid entries of table 64 having a UNIT ID field containing a value which matches the contents of the unit ID field UnitID[4:0] of the non-coherent Flush packet will be referred to as candidate entries. Data buffer 62 checks the TRANSACTION TYPE field of each candidate entry to see if the contents of the TRANSACTION TYPE field identifies the entry as being associated with a posted write transaction. If none of the candidate entries is associated with a posted write transaction, host bridge 28 transmits a non-coherent target done (NTD) response packet to source I/O node 24A indicating that all posted write transactions previously issued by I/O node 24A have at least reached points of coherency within processing subsystem 12.

On the other hand, if the Flush notes that at least one of the candidate entries is associated with a posted write transaction, host bridge 28 delays transmitting the NTD response packet to source I/O node 24A until all of the noted posted entries have exited the buffer 62, regardless of whether new posted entries have entered the buffer in the meantime. Translation logic may store information associated with the Flush request within buffer 62. For example, translation logic 60 may use the contents of Cmd[5:0] to determine if the packet conveys a Flush request, and may assign a corresponding value to a TRANSACTION TYPE identifier. Translation logic 60 may provide the TRANSACTION TYPE identifier, the contents of the unit ID field UnitID[4:0] of the Flush packet, and the contents of the source tag field SrcTag[4:0] of the Flush packet to buffer 62. Data buffer 62 may store the value of the TRANSACTION TYPE identifier within the TRANSACTION TYPE field of an available (e.g., invalid) entry within table 64, the contents of the unit ID field UnitID[4:0] within the UNIT ID field of the entry, and the contents of the source tag field SrcTag[4:0] within the SOURCE TAG field of the non-coherent data portion of the entry. It is noted that the SOURCE TAG field in the coherent data portion of the Flush request entry may contain an unknown value. Buffer 62 may also set valid bit V of the entry to "1" to indicate that the Flush request entry is valid.

The sixth row in Table 58 of FIG. 12 includes a single wait requirement: "TgtDone$_2$ on the non-coherent link must wait for TgtDone$_1$." In the example illustrated in FIG. 22, host bridge 28 must delay issuing the non-coherent target done (NTD) response packet corresponding to the Flush until a coherent target done (CTD) response packet corresponding to the previously issued posted write request is received from memory controller 22D. That is, the NTD packet cannot be issued until the posted write transaction storing data within memory 20D has reached a point of coherency. Memory controller 22D subsequently issues the coherent target done (CTD) response packet to host bridge 28 when the posted write transaction storing data within memory 20D reaches a point of coherency as described above.

Upon receiving the CTD response packet from memory controller 22D, data buffer 62 searches table 64 for the entry corresponding to the posted write transaction and invalidates the entry. During the search of table 64, data buffer 62 may note the presence of the valid Flush request entry within table 64. If at least one of the candidate entries within table 64 corresponds to a posted write transaction that was previously noted by the valid Flush request entry, data buffer 62 may take no further action at this time. On the other hand, if none of the candidate entries within table 64 was previously noted by the Flush, data buffer 62 may provide the contents of the UNIT ID field of the Flush request entry to translation logic 60 and invalidate the Flush request entry within table 64.

Host bridge 28 thus responds to the CTD response packet associated with the last valid posted write transaction issued by I/O node 24A prior to the Flush by issuing the NTD response packet to source I/O node 24A. The NTD response packet indicates that all posted write transactions issued by I/O node 24A prior to the Flush request have at least reached points of coherency within processing subsystem 12. I/O node 24A may thus continue with processing operations requiring previously issued posted write transactions to have at least reached points of coherency within computer system 10. As a result, memory coherency and I/O ordering may be preserved within computer system 10.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a processing subsystem including a plurality of processing nodes interconnected via coherent communication links, wherein the plurality of processing nodes includes a first processing node and a second processing node, and wherein the first processing node comprises a host bridge;
    a memory coupled to the second processing node;
    an input/output (I/O) node coupled to the first processing node via a non-coherent communication link, wherein the I/O node is configured to dispatch a first write transaction to store data within the memory, wherein the first write transaction is a posted write transaction, wherein the first write transaction is conveyed within a posted command virtual channel of the I/O subsystem, and wherein the posted command virtual channel is separate from a non-posted command virtual channel of the I/O subsystem;
    wherein the host bridge is configured to dispatch a second write transaction within the processing subsystem in response to the first write transaction, and wherein the second write transaction is directed to the second processing node;
    wherein the second processing node is configured to respond to the second write transaction by dispatching a target done response directed to the host bridge.

2. The computer system as recited in claim 1, wherein the first write transaction is completed by the I/O node in response to dispatch of the first write transaction by the I/O node.

3. The computer system as recited in claim 1, wherein the first write transaction is directed to the host bridge.

4. The computer system as recited in claim 1, wherein the I/O node is part of an I/O subsystem comprising a plurality of I/O nodes serially interconnected via non-coherent communication links.

5. The computer system as recited in claim 1, wherein the second processing node issues the target done response in response to the second write transaction at least reaching a point of coherency within the processing subsystem.

6. The computer system as recited in claim 5, wherein the second write transaction reaches the point of coherency when the second write transaction is: (i) ordered within the second processing node with respect to other requests pending within the second processing node, and (ii) a coherency state with respect to the second write transaction has been established in the other processing nodes.

7. The computer system as recited in claim 1, wherein each of the processing nodes comprises a processor core configured to execute instructions of a predefined instruction set.

8. The computer system as recited in claim 1, wherein the host bridge comprises translation logic for translating the first write transaction to the second write transaction.

9. The computer system as recited in claim 8, wherein the host bridge further comprises a data buffer for storing transaction information associated with the first and second write transactions.

10. The computer system as recited in claim 9, wherein the transaction information comprises information identifying the first write transaction as a posted write transaction, and information identifying the I/O node as the source of the first write transaction.

11. The computer system as recited in claim 10, wherein the information identifying the I/O node as the source of the first write transaction is a value extracted from the first write transaction by the host bridge.

12. The computer system as recited in claim 11, wherein the value is one of a plurality of values assigned to the I/O node.

13. A method in a computer system comprising a processing subsystem and an input/output (I/O) subsystem, the method comprising:
    the I/O subsystem dispatching a first write transaction to a host bridge of the processing subsystem, wherein the first write transaction is a posted write transaction, wherein the first write transaction is conveyed within a posted command virtual channel of the I/O subsystem, and wherein the posted command virtual channel is separate from a non-posted command virtual channel of the I/O subsystem;
    the host bridge translating the first write transaction to a second write transaction;
    the host bridge dispatching the second write transaction to a target within the processing subsystem; and
    the target dispatching a target done response directed to the host bridge in response to the second write transaction.

14. The method as recited in claim 13, wherein an I/O node within the I/O subsystem is a source of the first write transaction.

15. The method as recited in claim 13, wherein the first and second write transactions and the target done response are dispatched as one or more packets.

16. The method as recited in claim 13, wherein the processing subsystem comprises a plurality of processing nodes, and wherein the target is one of the plurality of processing nodes.

17. The method as recited in claim 13, wherein the target dispatches the target done response in response to the second write transaction at least reaching a point of coherency within the computer system.

18. The method as recited in claim 17, wherein the second write transaction reaches the point of coherency when the second write transaction is: (i) ordered within the target with respect to other requests pending within the target, and (ii) a coherency state with respect to the second write transaction has been established in the other processing nodes.

19. The method as recited in claim 17, wherein the target done response signifies that the second write transaction has at least reached the point of coherency within the processing subsystem.

20. A computer system, comprising:

a processing node;

an input/output (I/O) node;

a bridge node coupled to the processing node via a coherent communication link and to the I/O node via a non-coherent communication link;

wherein the I/O node is configured to transmit a first posted request packet targeted at the processing node, the first posted request packet being transmitted on a non-coherent posted command virtual channel separate from a non-coherent non-posted command virtual channel;

wherein the bridge node is configured to transmit a second posted request packet targeted at the processing node based upon the first posted request packet, the second posted request packet being transmitted via a coherent posted command virtual channel separate from a coherent non-posted command virtual channel; and wherein the processing node is configured to transmit a response packet to the bridge node in response to the second posted request packet.

21. The computer system as recited in claim 20, wherein the first posted request packet is a posted write request packet.

22. The computer system as recited in claim 20, wherein the I/O node is part of an I/O subsystem comprising a plurality of I/O nodes serially interconnected via non-coherent communication links.

23. The computer system as recited in claim 20, wherein the processing node is part of a processing subsystem comprising a plurality of processing nodes interconnected via coherent communication links.

24. The computer system as recited in claim 20, wherein the processing node is configured to transmit the response packet via a coherent response virtual channel separate from the coherent posted command virtual channel.

25. The computer system as recited in claim 23, wherein the processing node transmits the response packet in response to the second posted request packet reaching a point of coherency within the processing subsystem.

26. The computer system as recited in claim 20, wherein the bridge node comprises translation logic to translate the first posted request packet to second posted request packet.

27. A method in a computer system comprising a processing subsystem and an input/output (I/O) subsystem, the method comprising:

receiving, at a bridge node, a first posted request packet from the I/O subsystem targeted at a processing node in the processing subsystem, the bridge node being coupled to the I/O subsystem via a non-coherent communication link and to the processing subsystem via a coherent communication link;

translating the first posted request packet to a second posted request packet;

transmitting the second posted request packet to the processing node wherein the second posted request packet is transmitted to the processing node via a posted command virtual channel separate from a non-posted command virtual channel of the processing subsystem; and transmitting, from the processing node to the bridge node, a response packet in response to the second posted request packet.

28. The method as recited in claim 27, wherein the response packet is transmitted to the bridge node via a response virtual channel separate from the posted command virtual channel of the processing subsystem.

29. The method as recited in claim 27, wherein the first posted request packet is a posted write request packet.

30. The method as recited in claim 27, wherein the response packet is transmitted in response to the second posted request packet reaching a point of coherency within the processing subsystem.

* * * * *